(12) United States Patent
Loikits

(10) Patent No.: US 12,553,916 B1
(45) Date of Patent: Feb. 17, 2026

(54) SYSTEM FOR MEASURING SKEW AND SPEED OF AN ARROW

(71) Applicant: Daniel Loikits, Grafton, OH (US)

(72) Inventor: Daniel Loikits, Grafton, OH (US)

( * ) Notice: Subject to any disclaimer, the term of this patent is extended or adjusted under 35 U.S.C. 154(b) by 0 days.

(21) Appl. No.: 19/257,399

(22) Filed: Jul. 1, 2025

Related U.S. Application Data

(60) Provisional application No. 63/814,405, filed on May 29, 2025, provisional application No. 63/675,225, filed on Jul. 24, 2024.

(51) Int. Cl.
| | | |
|---|---|---|
| *F41J 5/02* | (2006.01) | |
| *F41J 5/00* | (2006.01) | |
| *F41J 5/14* | (2006.01) | |
| *G01P 3/68* | (2006.01) | |

(52) U.S. Cl.
CPC ............. *G01P 3/685* (2013.01); *F41J 5/00* (2013.01); *F41J 5/02* (2013.01); *F41J 5/14* (2013.01)

(58) Field of Classification Search
None
See application file for complete search history.

(56) References Cited

U.S. PATENT DOCUMENTS

| | | | |
|---|---|---|---|
| 3,590,225 A | | 6/1971 | Murphy |
| 3,619,630 A | | 11/1971 | McLeod |
| 3,788,748 A | | 1/1974 | Walden |
| 3,807,858 A | * | 4/1974 | Finch .......... F41J 5/02 250/222.2 |
| 4,949,972 A | * | 8/1990 | Goodwin ........ F41J 5/02 273/408 |
| 5,727,789 A | | 3/1998 | Butts |
| 6,191,574 B1 | | 2/2001 | Dilger |
| 6,717,684 B1 | * | 4/2004 | Fikes .......... F41J 5/02 250/221 |
| 6,931,166 B2 | | 8/2005 | Gauthier, Jr. |
| 6,985,206 B2 | | 1/2006 | Anderson |
| 7,367,906 B2 | * | 5/2008 | Tien ............ A63B 69/0002 473/422 |
| 8,221,273 B2 | | 7/2012 | Donahoe |
| 8,632,338 B2 | | 1/2014 | Miasnik |
| 8,720,896 B2 | | 5/2014 | Matthis |
| 9,303,954 B2 | | 4/2016 | Lim |

(Continued)

*Primary Examiner* — Sunit Pandya
(74) *Attorney, Agent, or Firm* — QuickPatents, LLC; Kevin Prince

(57) ABSTRACT

An archery tuning apparatus includes two light detection units, each comprising a line laser source emitting a planar fan of laser light and a curved array of spaced-apart light sensors. The units are configured with parallel laser fans, creating an overlap target region when viewed along a normal axis. The curved sensor arrays, with radii of curvature approximating their irradiation distances, optimize detection accuracy. Integrated circuitry and software collect and analyze data from arrows shot through the target region during tuning sessions. The apparatus connects to a mobile device, which stores and displays tuning session information through a dedicated app. This system provides archers with precise measurements of arrow speed and skew, offering advantages over traditional paper tuning methods. The mobile interface allows for easy data management, equipment tracking, and remote technical assistance, enhancing the overall archery tuning experience.

19 Claims, 20 Drawing Sheets

(56) References Cited

U.S. PATENT DOCUMENTS

| | | |
|---|---|---|
| 10,962,336 B2 | 3/2021 | Hollinger |
| 11,306,993 B2 | 4/2022 | Bushman |
| 11,976,905 B2 | 5/2024 | Chia |
| 2003/0171150 A1 | 9/2003 | Oki |
| 2004/0239915 A1 | 12/2004 | Anderson |
| 2014/0118720 A1 | 5/2014 | Steffl |
| 2014/0151965 A1 | 6/2014 | Garas |
| 2016/0305749 A9 | 10/2016 | Mason |
| 2019/0234702 A1 | 8/2019 | Kelly |
| 2021/0364252 A1 | 11/2021 | Heeke |
| 2022/0074716 A1 | 3/2022 | Chia |
| 2022/0196363 A1 | 6/2022 | Allgaier |
| 2022/0252380 A1* | 8/2022 | Vaquer .................. F41J 5/02 |
| 2023/0130005 A1 | 4/2023 | Rabinovich |
| 2023/0168066 A1 | 6/2023 | Hutchison |
| 2024/0110770 A1 | 4/2024 | Moore-Montgomery |
| 2024/0125582 A1 | 4/2024 | Leontev |
| 2024/0255541 A1 | 8/2024 | Barry et al. |
| 2025/0027753 A1 | 1/2025 | Thoma |

\* cited by examiner

SYSTEM FOR MEASURING SKEW AND SPEED OF AN ARROW

CROSS REFERENCE TO RELATED APPLICATIONS

This application claims the benefit of U.S. Provisional Patent Application 63/675,225, filed on Jul. 24, 2024, as well as U.S. Provisional Patent Application 63/814,405, filed on May 29, 2025, both incorporated herein by reference.

STATEMENT REGARDING FEDERALLY SPONSORED RESEARCH AND DEVELOPMENT

Not Applicable.

FIELD OF THE INVENTION

This invention relates to archery tuning, and more particularly to systems configured to provide information based on a flight of an arrow.

BACKGROUND

Paper tuning is a widely used method for measuring arrow skew, which is the deviation in an arrow's flight caused by improper bow setup or arrow tuning. However, this method does not directly assess arrow speed, a critical factor in hunting performance. By shooting an arrow through a taut sheet of paper at close range (6-10 feet), archers analyze the tear pattern to diagnose issues like incorrect nock point, rest misalignment, or arrow spine mismatch, with a perfect "bullet hole" indicating straight flight and specific tears (high, low, left, right) guiding adjustments. While effective for initial tuning, paper tuning offers no insight into arrow velocity-typically 150-350 feet per second or more depending on the bow-which requires separate tools like a chronograph to measure. Other shortcomings of the paper tuning method include impact of humidity and temperature on the paper, the need to ensure that the paper is uniformly taut on a frame, limits of detecting slight deviations in the tear patterns, wear and tear on the arrows being shot through the paper multiple times, manual documentation of each tear pattern on the paper, limitation to using a single bow and arrow setup for each setup, no specific guidance on how to correct for skewed arrow flight, and limitations to certain types of arrowheads. For example, paper tuning depends on the type of arrowhead, and broadheads give a larger initial tear than field tips, complicating a comparison of the two. Additionally, expert assistance in tuning arrows may require a trip to an archery pro shop, if one is available.

There is a need for a device that provides a system that can ameliorate difficulties in arrow tuning sessions, and enable an archer to accurately detect, measure and display the skew and speed of an arrow shot from a bow, whether that arrow has a broadhead or field tip attached. It is desirable to have software to save and track the history of those measurements over time and enable remote connection with resources for assistance in the correction of deficiencies in the arrow. The present invention accomplishes these objectives.

SUMMARY OF THE INVENTION

The present device is an apparatus configured to detect and measure properties of an arrow shot from a bow. In an embodiment of the apparatus invention, the apparatus includes a first light detection unit and a second light detection unit. The first light detection unit and the second light detection unit each include a separate line laser source configured to emit a planar fan of laser light. The two planar fans of laser light are oriented parallel to each other and separated by a perpendicular distance. In embodiments of the apparatus, each light detection unit includes a separate array of spaced-apart light sensors configured to lie in the planar fan of laser light along an arc that lies entirely within a divergence angle of the respective planes of laser light. Each of the light detection units is configured to sense their respective fan of laser light on a concave side of the arc. Each arc has a respective radius of curvature.

In embodiments of the apparatus, each light detection unit includes a directional vector extending from the line laser source to a midpoint of the array of spaced-apart light sensors and has an irradiation distance. The respective radii of curvature are within about +/−50 percent or less of the irradiation distances.

In embodiments of the apparatus, the detection units further include light sensor holders defining arrays of openings configured to hold the arrays of spaced apart light sensors along their respective arcs. In some embodiments each array of spaced-apart light sensors is recessed into an array of openings to shield the light sensors from ambient light.

In embodiments of the apparatus, the parallel planar fans of laser light overlap to define an overlap target region defined by the overlap of their respective line laser source and spaced-apart light sensors when viewed along a normal axis through both planes.

In some embodiments, the apparatus includes a frame structure configured to support both of the light detection units in a configuration to permit the arrow shot from a bow to pass entirely through the overlap target region.

In embodiments of the apparatus, integrated circuitry is functionally attached to each of the light detection units, and computer software is configured to convert the target signals into information about properties of the arrow shot from a bow.

Some embodiments of the apparatus may further include a transmitter, and a mobile device configured to display the information about properties of the arrow. The mobile app may further include display screens for device connections, a tuning session management. equipment selection, a shot data display, and a technician communication screen.

Other features and advantages of the present invention will become apparent from the following more detailed description, taken in conjunction with the accompanying drawings, which illustrate, by way of example, the principles of the invention.

DETAILED DESCRIPTION OF THE PREFERRED EMBODIMENT

Figure 1:
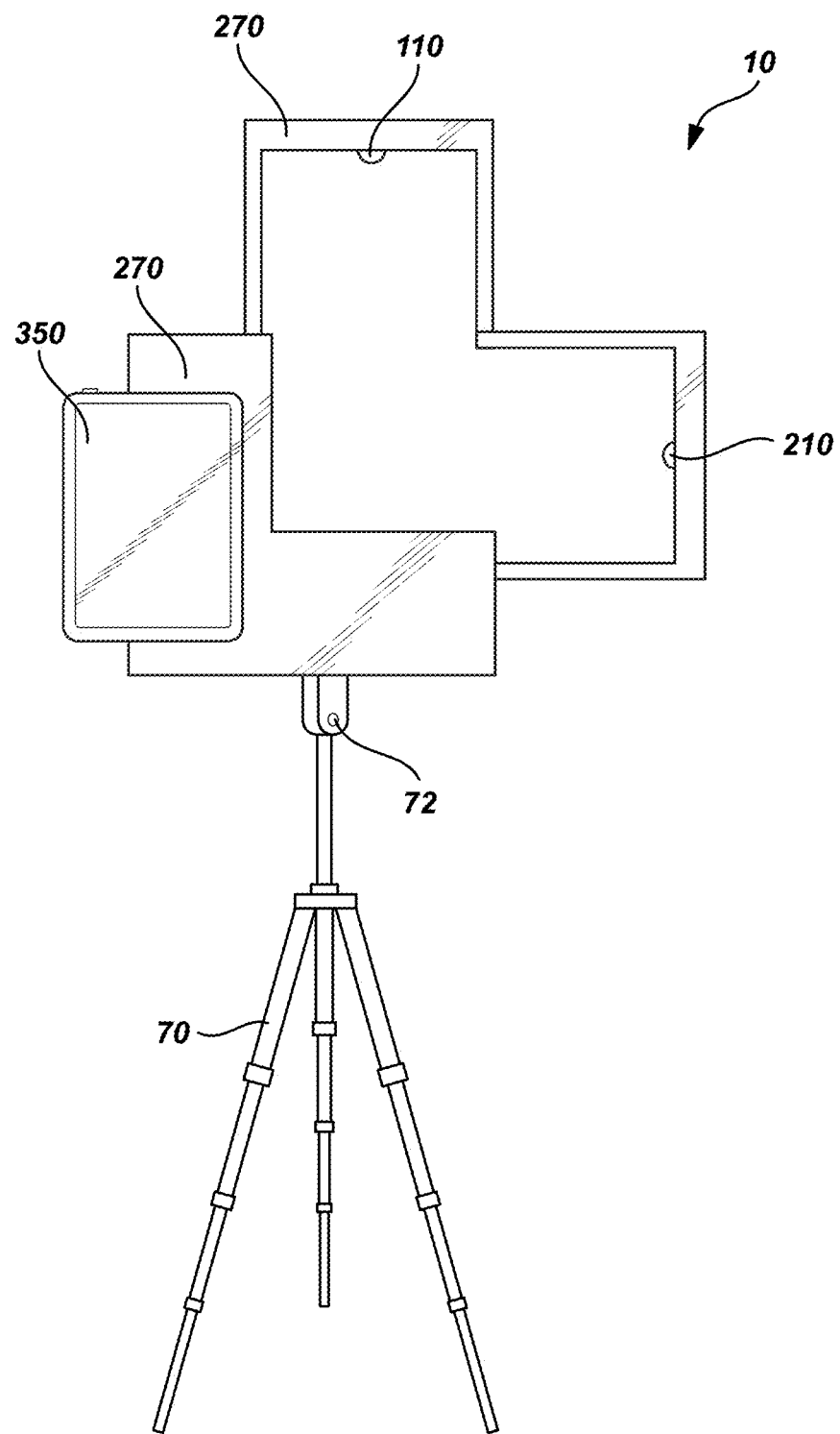
FIG. 1 is a front view of an apparatus according to an embodiment of the invention.

Illustrative embodiments of the invention are described below. The following explanation provides specific details for a thorough understanding of and enabling description for these embodiments. One skilled in the art will understand that the invention may be practiced without such details. In other instances, well-known structures and functions have not been shown or described in detail to avoid unnecessarily obscuring the description of the embodiments.

Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number also include the plural or singular number respectively. Additionally, the words "herein," "above," "below" and words of similar import, when used in this application, shall refer to this application as a whole and not to any particular portions of this application. When the claims use the word "or" in reference to a list of two or more items, that word covers all of the following interpretations of the word: any of the items in the list, all of the items in the list and any combination of the items in the list. When the word "each" is used to refer to an element that was previously introduced as being at least one in number, the word "each" does not necessarily imply a plurality of the elements but can also mean a singular element.

In an embodiment of the invention, apparatus 10 (FIGS. 1-7) is configured to detect and measure properties of an arrow 20 shot from a bow. The apparatus 10 includes a first light detection unit 100 and a second light detection unit 200. Referring to FIG. 2, several geometrical features of first light detection unit 100 are shown. Features of the second light detection unit 200 are at least similar to corresponding features of the first light detection unit 100. For simplicity in understanding the invention, FIG. 2 shows only features of the first light detection unit 100, although similar reference numbers (in a "200 series") are used throughout the description in reference to corresponding features of the second light detection unit 200.

In embodiments of the apparatus 10, the first light detection unit 100 includes a first line laser source 110 configured to emit a first planar fan of laser light 115 with a first divergence angle 113. The second light detection unit 200 includes a second line laser source 210 configured to emit a second planar fan of laser light 215 with a second divergence angle 213. In some embodiments of the apparatus 10, values for the first divergence angle 113 and the second divergence angle 213 are each independently in a range from about 10 degrees to about 180 degrees.

In embodiments of the apparatus 10, the first planar fan of laser light 115 is oriented parallel to the second planar fan of laser light 215. A normal axis 30 passes through and is orthogonal to the first planar fan of laser light 115 and the second planar fan of laser light 215. The first planar fan of laser light 115 and the second planar fan of laser light 215 are spaced apart by a perpendicular distance 50 (see FIG. 4) along the normal axis 30. The perpendicular distance 50 may be selected to obtain a desired level of accuracy for measurement of the speed of the arrow 20 shot from a bow. In some embodiments the perpendicular distance 50 may be or in a range of from about 2 cm to about 100 cm.

Figure 3:
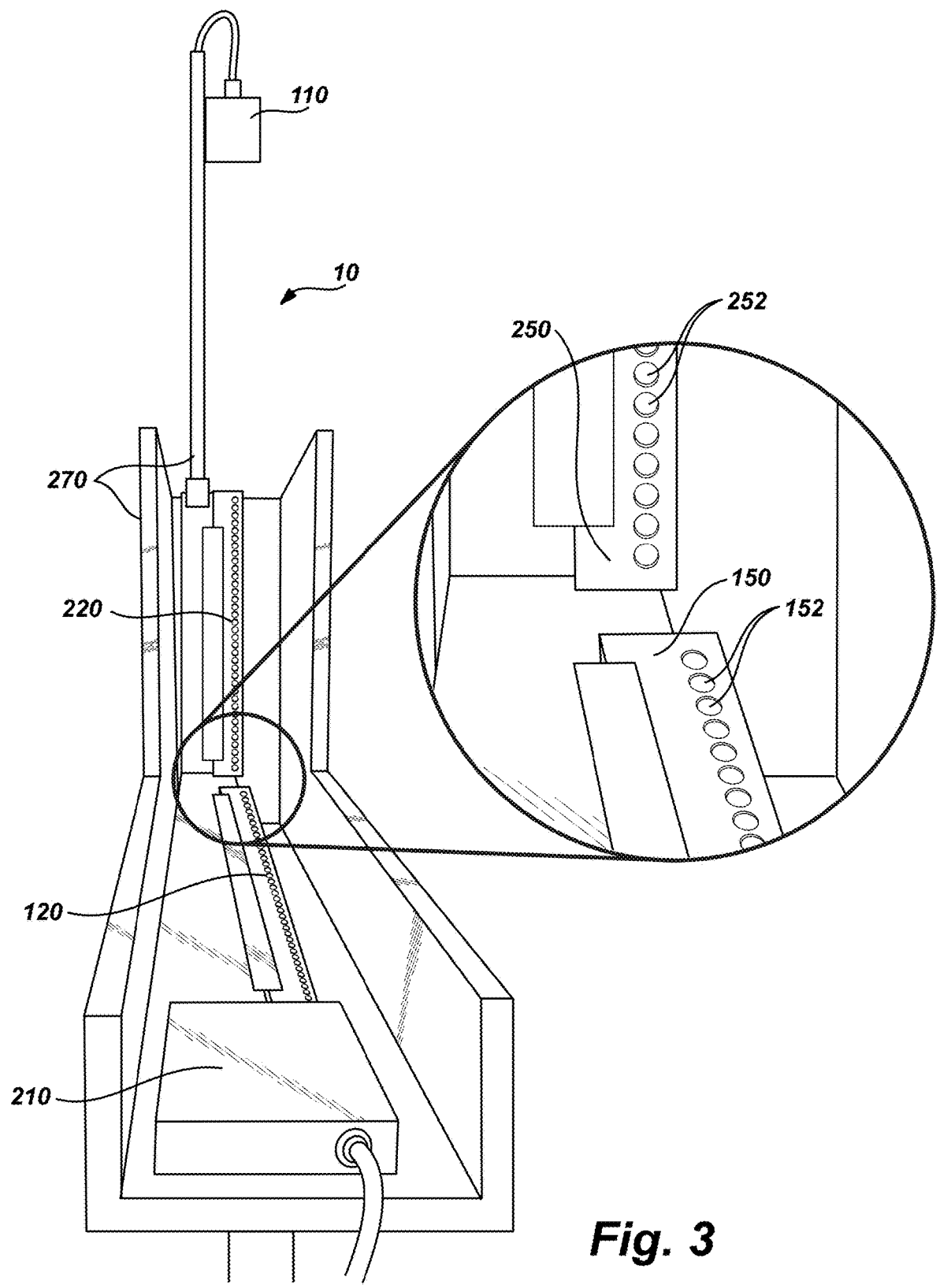
FIG. 3 is a side view of an apparatus according to an embodiment of the invention.
Figure 4:
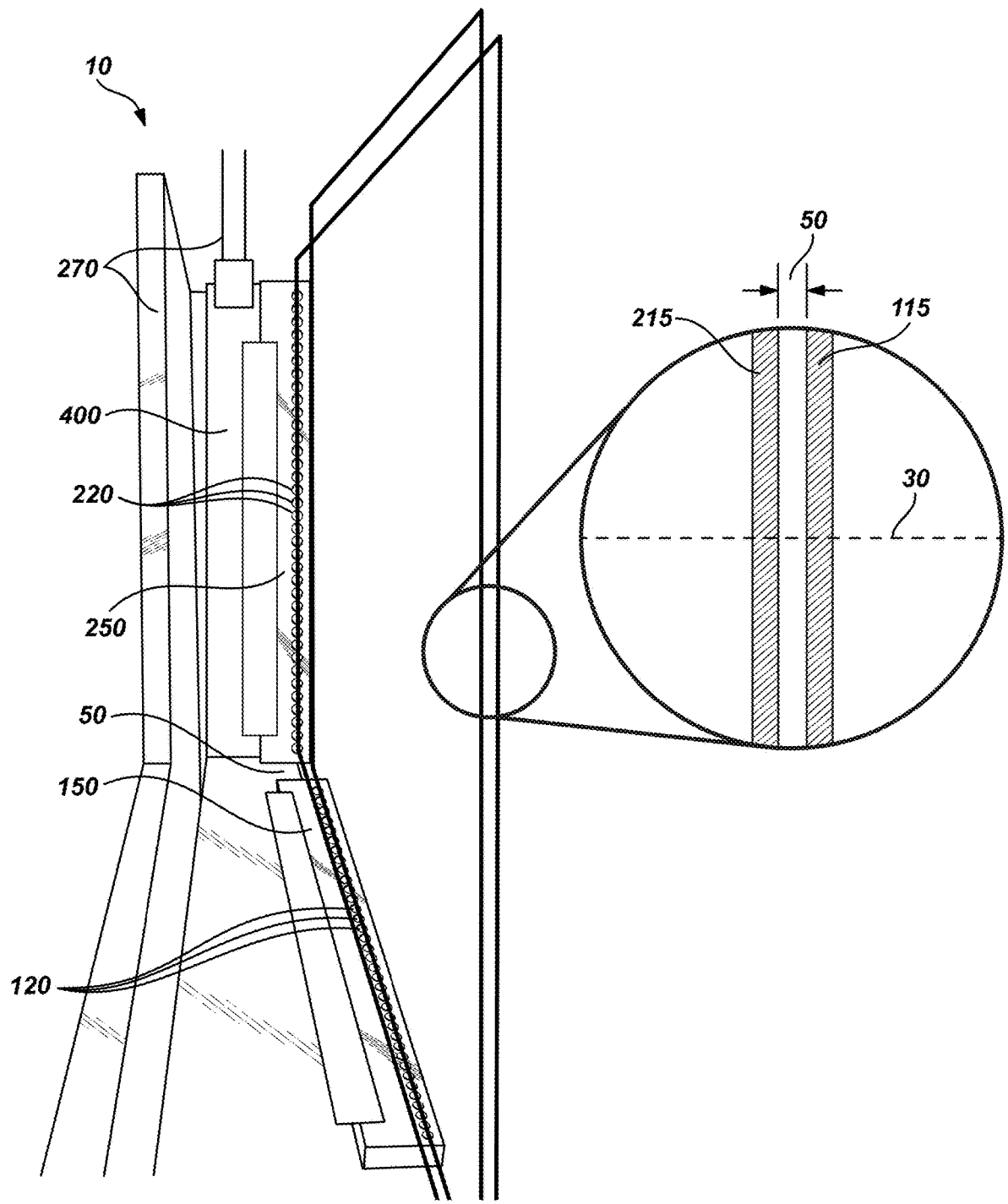
FIG. 4 is a close-up side view of an apparatus according to an embodiment of the invention.
Figure 5C:
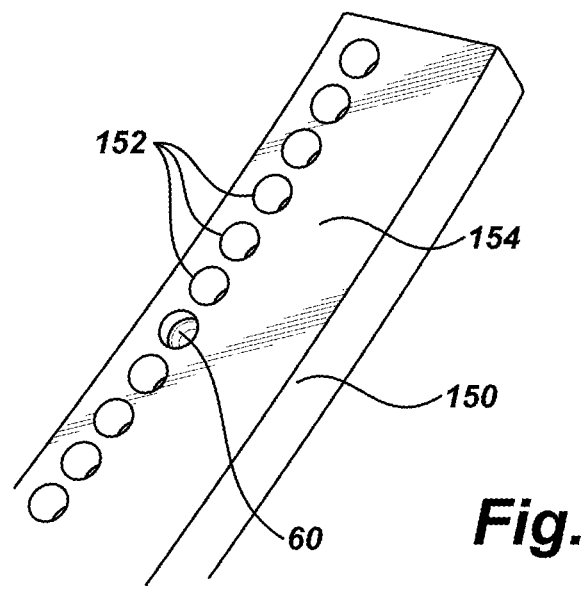
FIG. 5C is a close-up perspective view of a segment of a light sensor holder according to an embodiment of the invention.
Figure 5A:
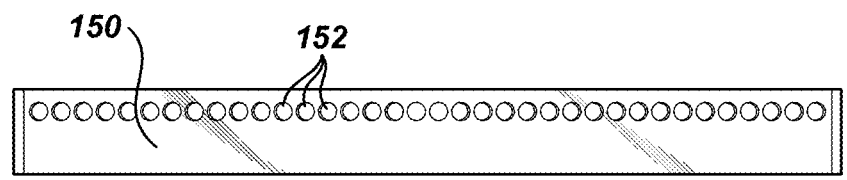
FIG. 5A is a top-down view of a light sensor holder according to an embodiment of the invention.
Figure 5B:
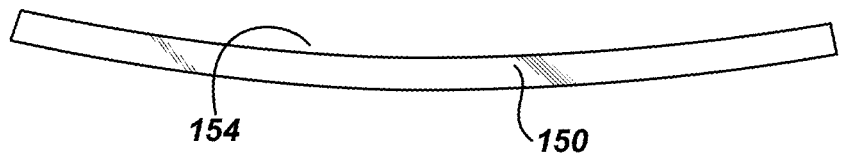
FIG. 5B is a side view of a light sensor holder according to an embodiment of the invention.

In some embodiments, the apparatus 10 may be selectively configurable such that the arrow 20 shot from a bow first encounters the first light detection unit 100 and subsequently the second light detection unit 200, or alternatively first encounters the second light detection unit 200 and subsequently the first light detection unit 100 (see FIG. 3).

In embodiments of the apparatus 10, the first light detection unit 100 includes a first array of spaced-apart light sensors 120 configured to lie in the first planar fan of laser light 115 along a first arc 117 and disposed entirely within the first divergence angle 113. The first array of spaced-apart light sensors 120 is configured to sense the first planar fan of laser light 115 on a first concave side 124 of the first arc 117 (see FIG. 2). The first arc 117 has a first radius of curvature 118.

In embodiments of the apparatus 10, the second light detection unit 200 includes a second array of spaced-apart light sensors 220 configured to lie in the second planar fan of laser light 215 along a second arc 217 and disposed entirely within the second divergence angle 213. The second array of spaced-apart light sensors 220 is configured to sense the second planar fan of laser light 215 on a second concave side 224 of the second arc 217. The second arc 217 has a second radius of curvature 218.

In embodiments of the apparatus 10, the first array of spaced-apart light sensors 120 and the second array of spaced-apart light sensors 220 each include at least one light sensor 60 (FIG. 2). In some embodiments, the arrays of spaced-apart light sensors (120 and 220) may independently include from about 3 to about 100, from about 10 to about 80, from about 20 to about 70, from about 30 to about 60, or even from about 40 to about 50 individual light sensors 60. In some embodiments, the individual light sensors 60 may be spaced apart evenly along the respective first and second arcs (117 and 217). In some embodiments, the individual light sensors 60 may be evenly spaced-apart with minimal gaps between them, for example, about 0.6 mm. For accuracy in detecting an arrow 20 shot from a bow, it is beneficial to have the individual light sensors 60 spaced closely. The individual light sensors 60 may be, for example, photodiodes selected to have suitable response characteristics for detecting a shadow produced by the arrow 20 penetrating the first and second planar fans of laser light 115 and 215.

In embodiments of the apparatus 10, the first light detection unit 100 includes a first laser directional vector 140 extending from the first line laser source 110 to a first array midpoint 145 of the first array of spaced-apart light sensors 120 and having a first irradiation distance 148 (FIG. 2). A first radius of curvature 118 is within about +/−50 percent of the first irradiation distance 148. In some embodiments, the first radius of curvature 118 is within about +/−40 percent, about +/−30 percent, about +/−20 percent, about +/−10 percent, or even about +/−5 percent of the first irradiation distance 148.

In embodiments of the apparatus 10, the second light detection unit 200 includes a second laser directional vector 240 extending from the second line laser source 210 to a second array midpoint 245 of the second array of spaced-apart light sensors 220 and having a second irradiation distance 248. A second radius of curvature 218 is within +/−50 percent of the second irradiation distance 248. In some embodiments, the second radius of curvature 218 is within about +/−40 percent, about +/−30 percent, about +/−20 percent, about +/−10 percent or even about +/−5 percent of the second irradiation distance 248. In some embodiments of the apparatus 10, the first radius of curvature 118 and the first irradiation distance 148 are approximately equal, and the second radius of curvature 218 and the second irradiation distance 248 are approximately equal, and in this manner the apparatus optimizes the detection sensitivity in both of the first and second light detection units 100 and 200.

In embodiments of the apparatus 10, the first light detection unit 100 includes a first light sensor holder 150 defining a first array of openings 152 (FIG. 5A) configured with a first curved surface 154 (FIG. 5B) to hold the first array of spaced apart light sensors 120 along first arc 117, and the second light detection unit 200 includes a second light sensor holder 250 defining a second array of openings 252 configured with a second curved surface 254 to hold the second array of spaced apart light sensors 220 along second arc 217. First and second light sensor holders 150 and 250 may be made of any suitable materials, including plastic, wood, or metal, including plastics such as, for example, polylactic acid (PLA) suitable for 3D printing.

In some embodiments of the apparatus 10, the first array of spaced-apart light sensors 120 and the second array of spaced-apart light sensors 220 are recessed into a first array of openings 152 and a second array of openings 252, respectively (FIG. 5C), to a depth suitable for reducing the amount of ambient light reaching the light sensors.

Figure 20:
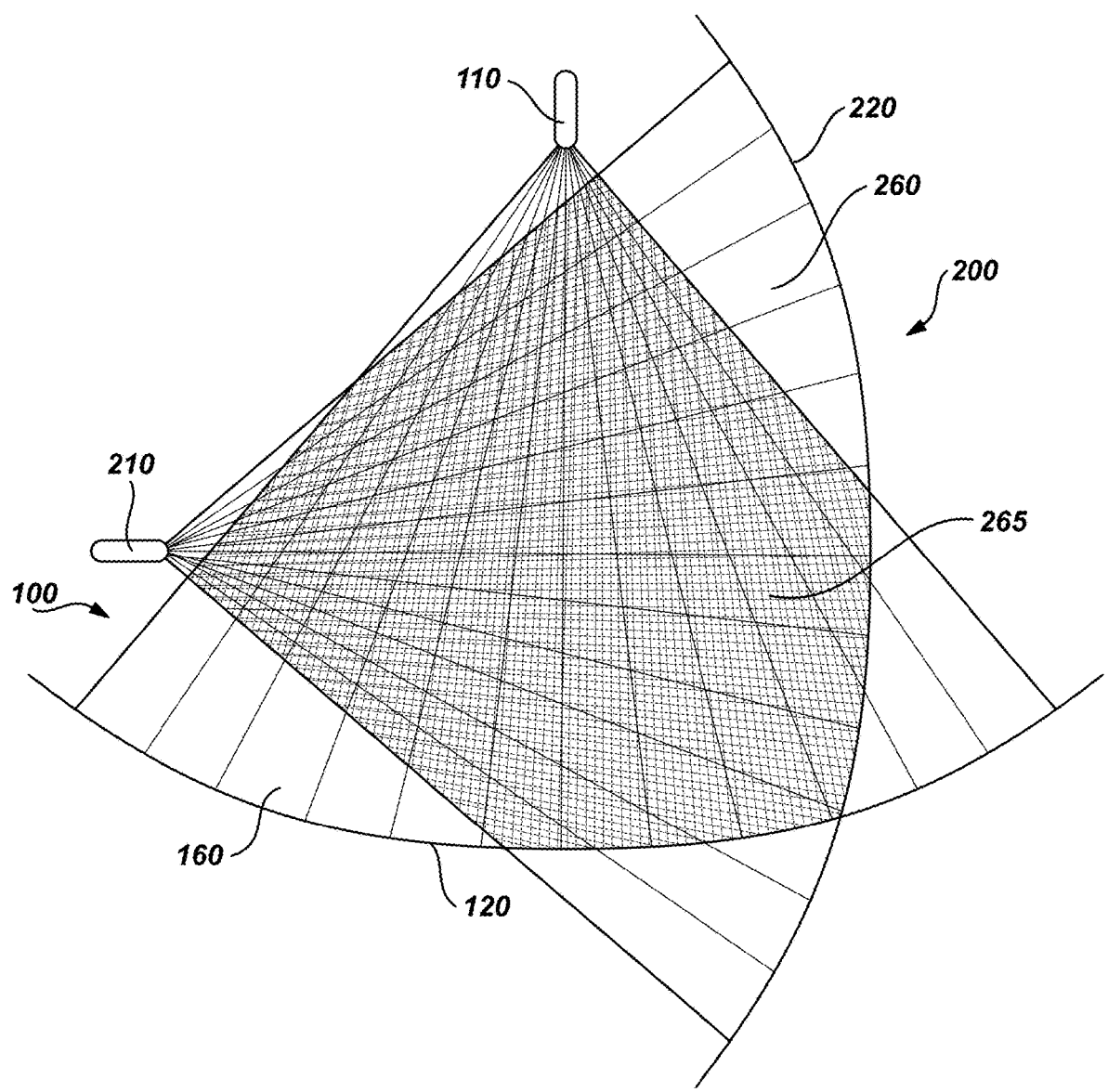
FIG. 20 illustrates a view of target areas in light detection units according to an embodiment of the invention.

In embodiments of the apparatus 10, the first light detection unit 100 including the planar fan of laser light 115 further includes a first target region 160 (FIG. 20) within an area defined by the first line laser source 110 and the first array of spaced-apart light sensors 120. The second planar fan of laser light 215 including the light detection unit 100 further includes a second target region 260 (FIG. 20) within an area defined by the second line laser source 210 and the second array of spaced-apart light sensors 220. FIG. shows an arrangement of the first array of spaced-apart light sensors 120 and the second array of spaced-apart light sensors 220 oriented in an orthogonal orientation. The first target region 160 and the second target region 260 are aligned for the normal axis 30 to pass through both. An overlap of the first target region 160 and the second target region 260, when viewed along the normal axis 30, provides an overlap target region 265 (FIG. 20). In some embodiments, the first target region 160 and the second target region 260 may overlap by at least 10%, at least 20%, at least 30%, at least 50%, at least 60%, or even at least 70% when viewed along a normal axis 30, to form the overlap target region 265. The size of the overlap target region 265 may be of a size suitable for shooting the arrow 20 from a distance of about 2 to 3 meters, for example, a size of about 25 cm by 25 cm.

Figure 2:
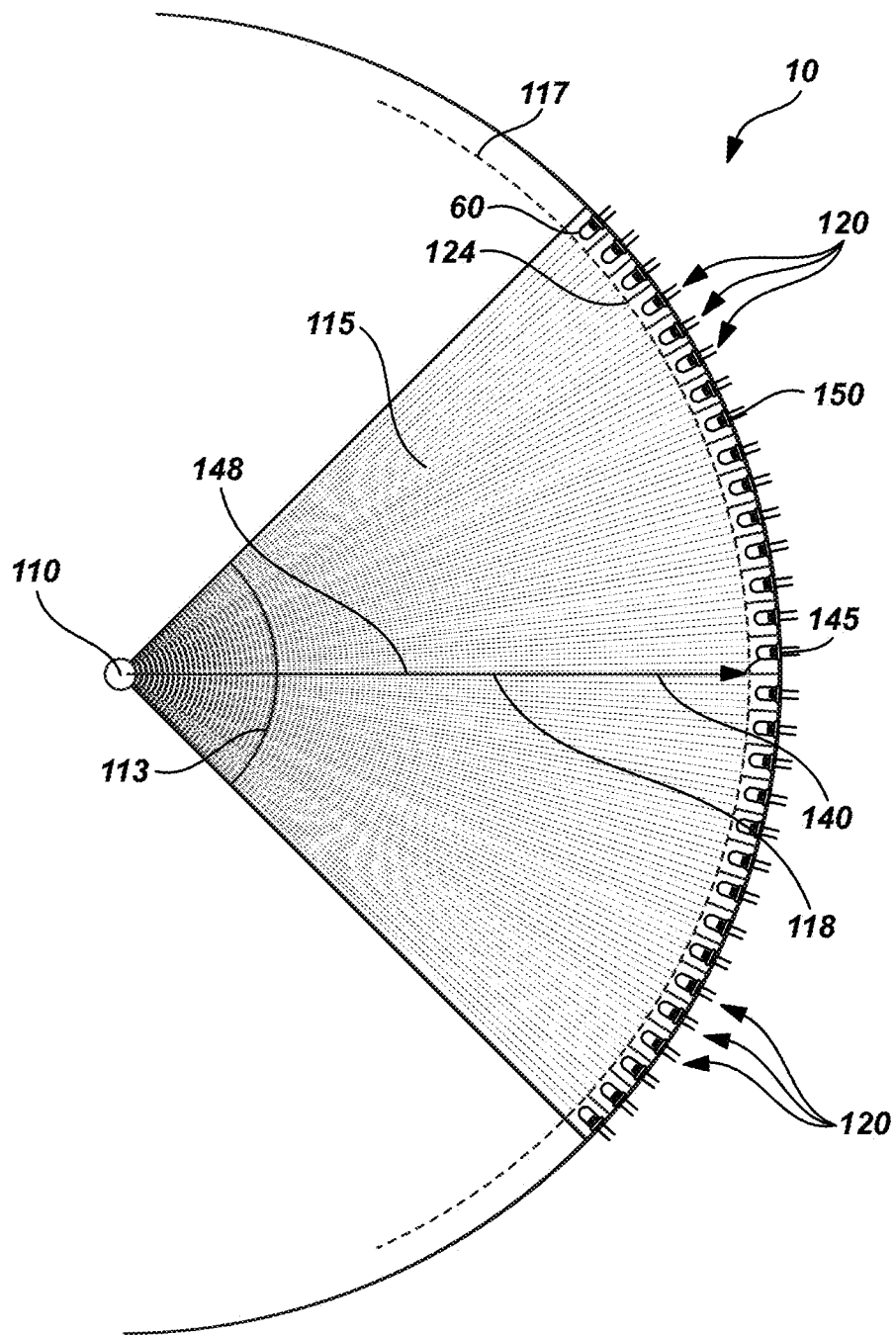
FIG. 2 illustrates geometrical aspects of the apparatus according to an embodiment of the invention.
Figure 6:
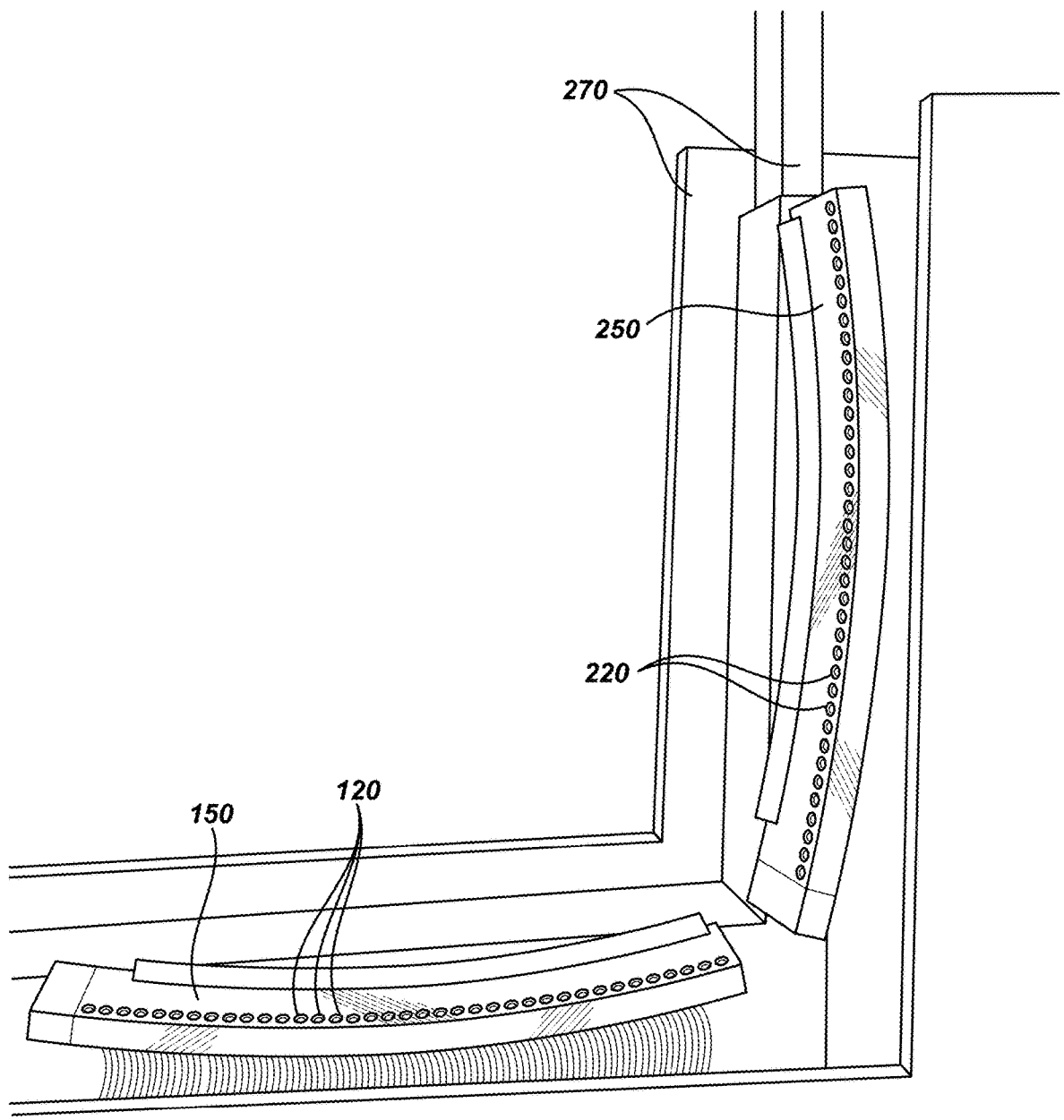
FIG. 6 shows a close-up view of arrays of spaced-apart optical sensors and their curved holders according to an embodiment of the invention.

In some embodiments, the apparatus 10 includes a frame structure 270 configured to support both the first light detection unit 100 and the second light detection unit 200 (FIG. 1, FIG. 6). The frame structure 270 is further configured to permit the arrow 20 shot from a bow to pass entirely through both the first target region 160 and the second target region 260.

In some other embodiments, the apparatus 10 may be configured to include separate frame subunits (not shown) to support the first light detection unit 100 in one of the frame subunits and the second light detection unit in another of the frame subunits, and the two separate frame subunits may be joined to form the frame structure 270. Advantages of having the separate frame subunits may include convenience of transporting the apparatus 10, and convenience in orientation of the first light detection unit 100 and the second light detection unit 200.

In some embodiments, the apparatus 10 may include a touch screen device 350 located on the frame structure 270 (FIG. 1) or other location suitable for observing information about the arrow 20, including skew and speed results for the arrow 20, and for touching user interface elements to interact with the touch screen device.

In some embodiments, the apparatus 10 includes an adapter 72 for attachment to a support, for example, a tripod 70 (see FIG. 1). In some embodiments, the apparatus 10 is configured to be sufficiently lightweight to be supported and stable on an ordinary 16 camera tripod.

Figure 7:
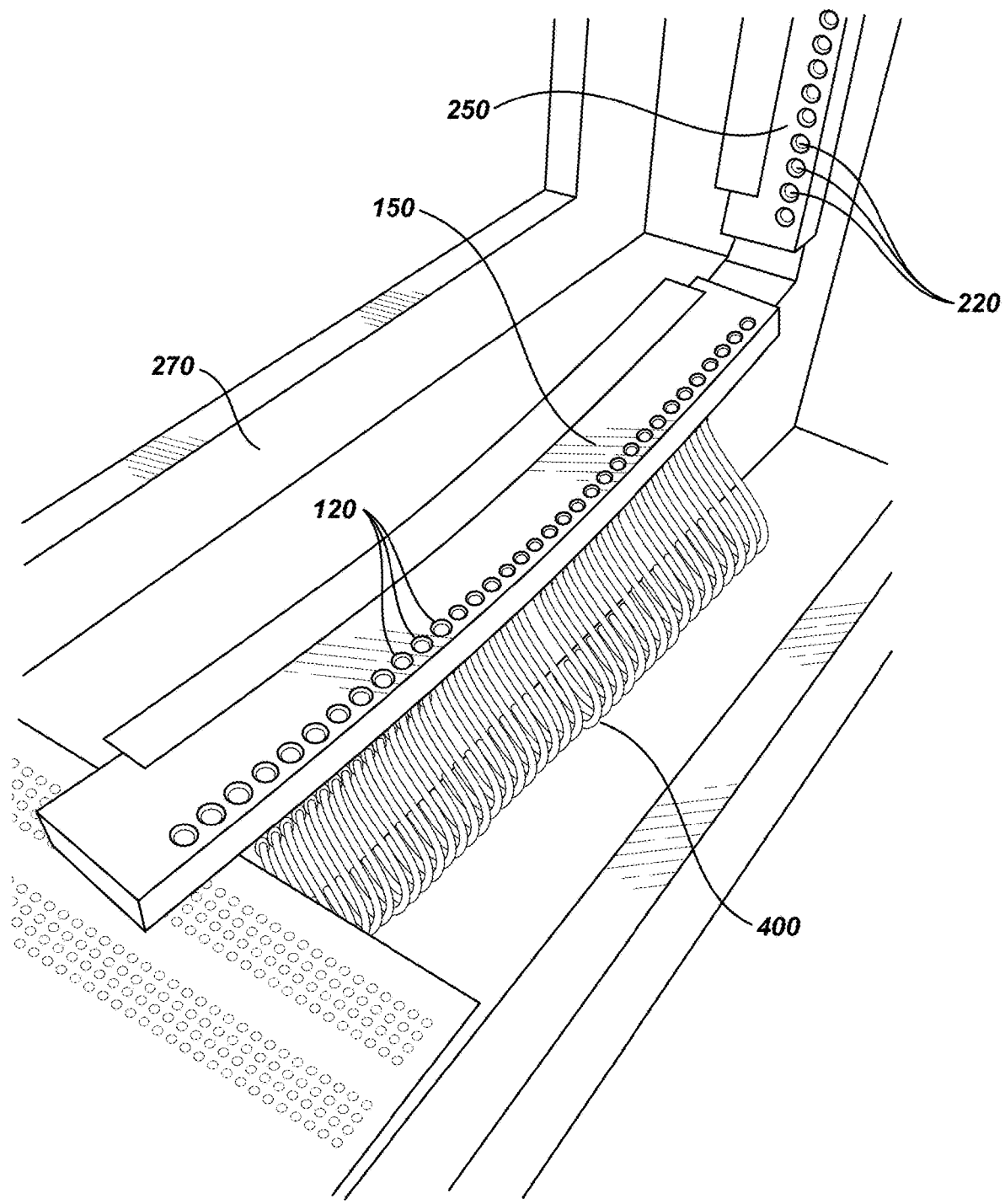
FIG. 7 shows a close-up view of integrated circuitry connected to an array of spaced-apart optical sensors according to an embodiment of the invention.

In some embodiments of the apparatus 10, the apparatus 10 may further include integrated circuitry 400 functionally attached to both the first light detection unit 100 and the second light detection unit 200 (see FIG. 7, showing wires connecting the arrays of spaced-apart light sensors 120 and 220 to unseen integrated circuit components). The integrated circuitry 400 is configured to be operable to receive target signals 410 from both the first array of spaced-apart light sensors 120 and the second array of spaced-apart light sensors 220. Computer software 420 is configured to be operable to convert the target signals 410 into information about properties of the arrow 20 shot from a bow. Accordingly, the apparatus measures speed and skew of the arrow 20 as it passes through the first target region 160 and the second target region 260 based on the target signals 410 received by the integrated circuitry 400 and processed by the computer software 420.

In some embodiments of the apparatus 10, apparatus 10 may further include: a transmitter 330 (FIG. 19) configured to transmit the information about properties of the arrow 20; a receiver 340 (FIG. 19) configured to receive the transmitted information; a mobile device (FIG. 19) including the receiver 340 and a mobile app 352 configured to display the information about properties of the arrow 20. The mobile app 352 may further include multiple display screens including a device connection screen 650 (FIG. 8), a tuning session management screen 660 (FIG. 9), an equipment selection screen 675 (FIG. 10), a shot data display screen 680 (FIG. 11), and a technician communication screen 710 (FIG. 12).

The mobile device 450 may connect with the touch screen device 350 on the frame structure 270 (FIG. 1) via Wi-Fi, Bluetooth, or other suitable means, and the touch screen device 350 may share the functionality of the mobile device 450. In some embodiments, the touch screen device 350 may operate without need of a connection with the mobile device 450.

Figure 8:
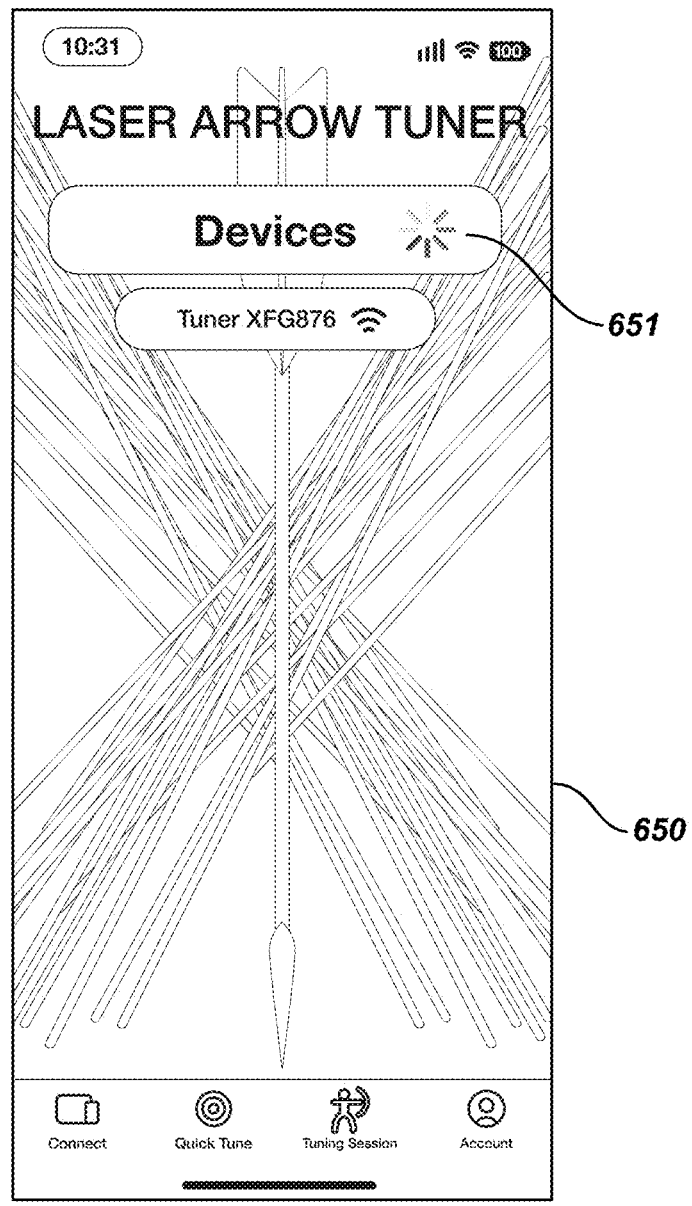
FIG. 8 is a sample display screen of a mobile device according to an embodiment of the invention.

FIG. 8 shows an embodiment of the device connection screen 650, including a device selection button 651. The device selection button 651 permits selection of a device to connect with (for example, by Wi-Fi).

Figure 9:
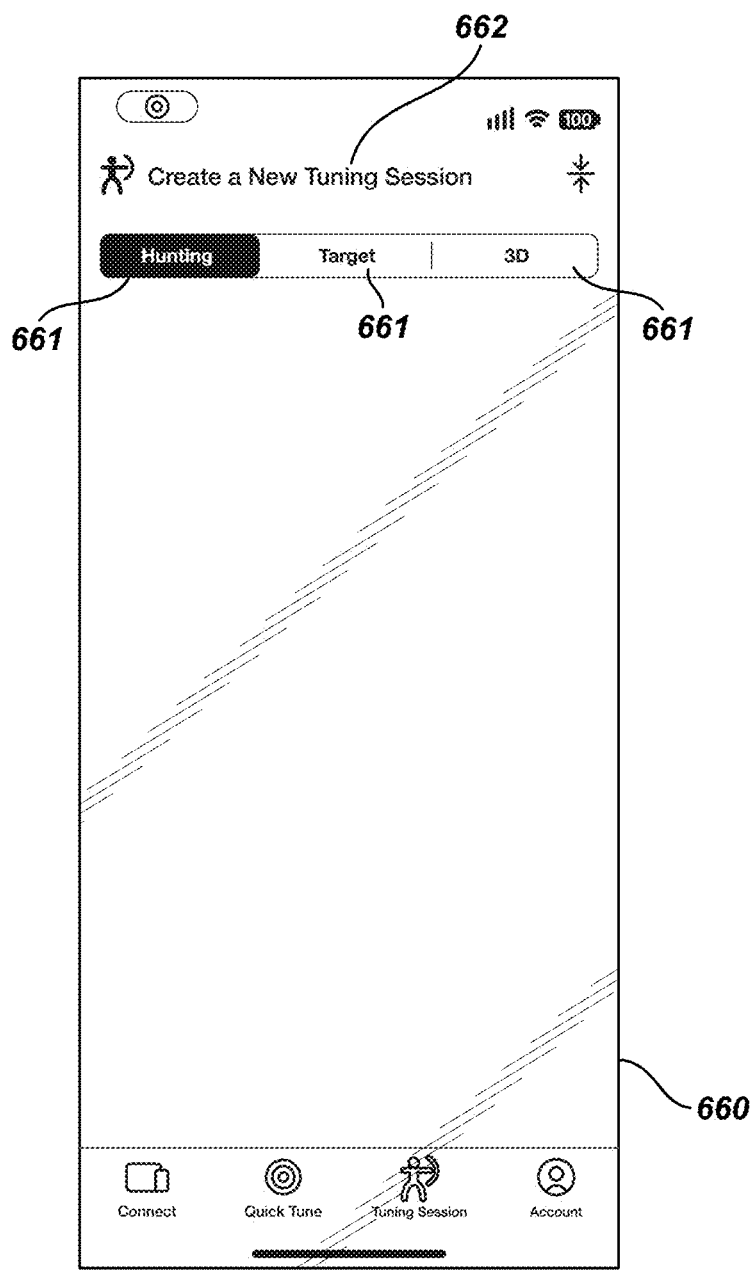
FIG. 9 is a sample display screen of a mobile device according to an embodiment of the invention.

FIG. 9 shows an embodiment of the tuning session management screen 660, including several mode selection tabs 661 and a status bar 662. The mode selection tabs 661 enable selection of a type of tuning session. The status bar 662 indicates that a new tuning session may be created, using the several mode selection tabs 661.

Figure 10:
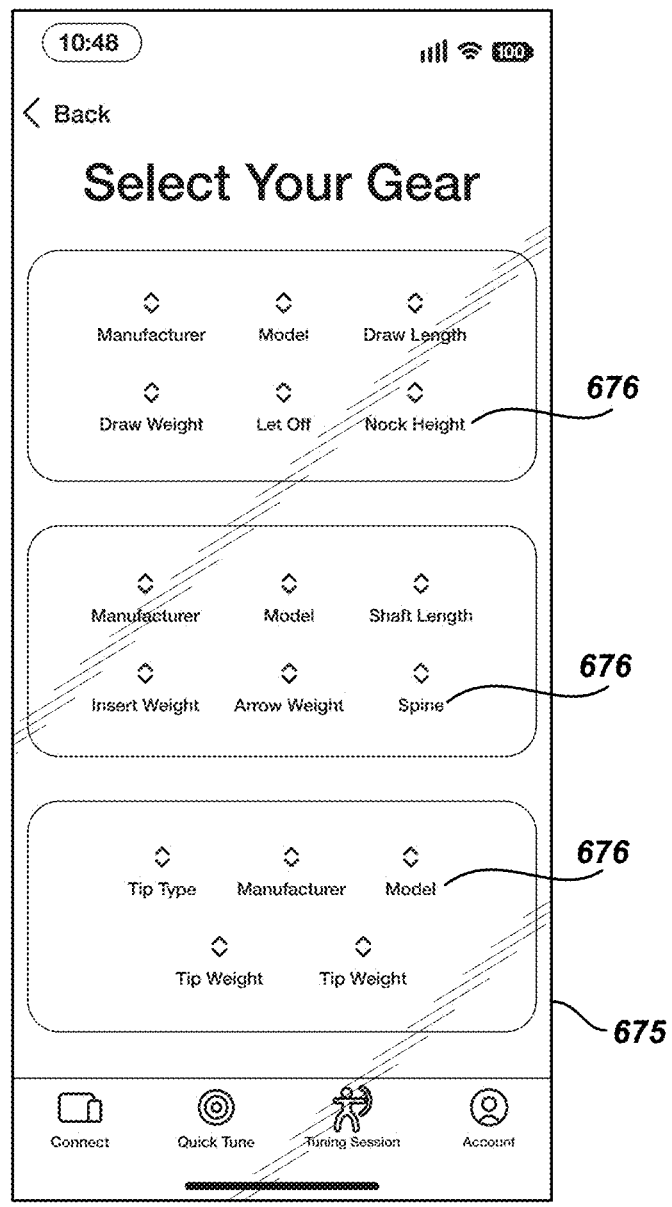
FIG. 10 is a sample display screen of a mobile device according to an embodiment of the invention.

FIG. 10 shows an embodiment of the equipment selection screen 675, including several equipment selection panels 676. The several equipment selection panels 676 include features related to the arrow 20, a bow for shooting the arrow, and a tip for the arrow 20 used in a tuning session. The features may include, for example manufacturer, model, shaft length, arrow weight, tip type, and other relevant features.

Figure 11:
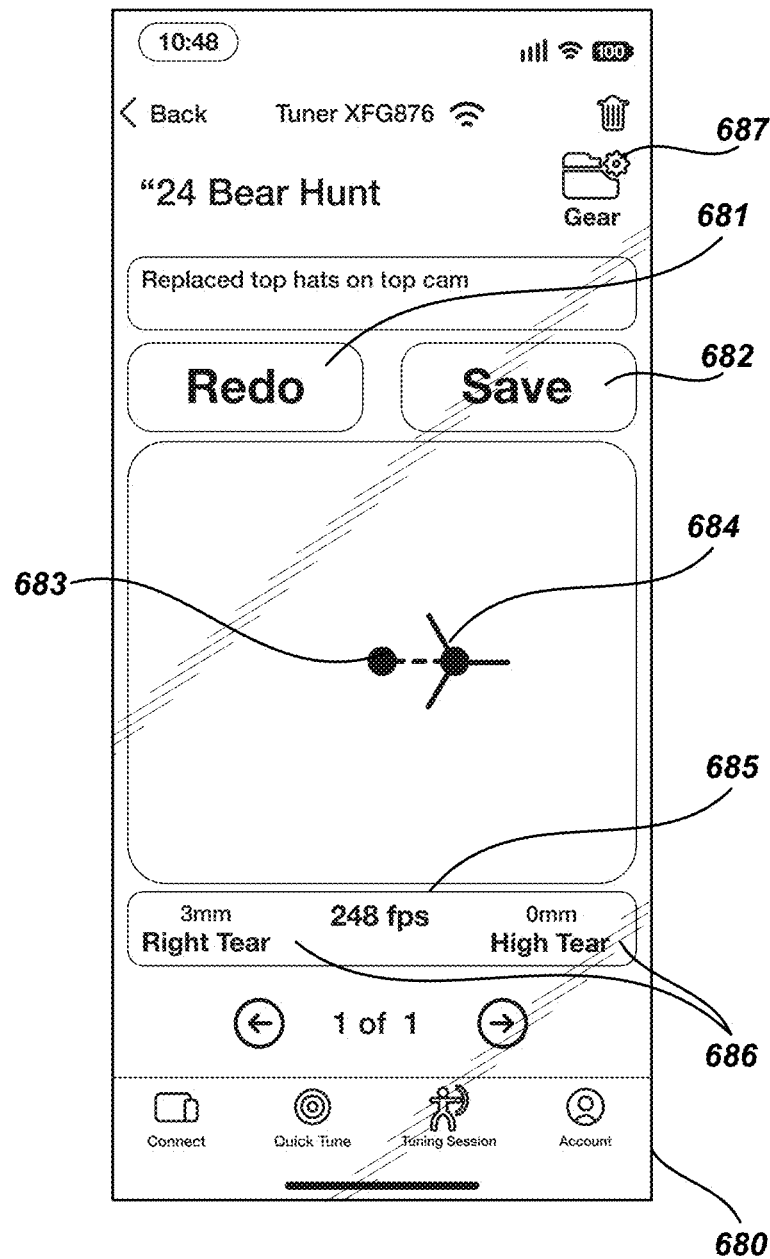
FIG. 11 is a sample display screen of a mobile device according to an embodiment of the invention.
Figure 12:
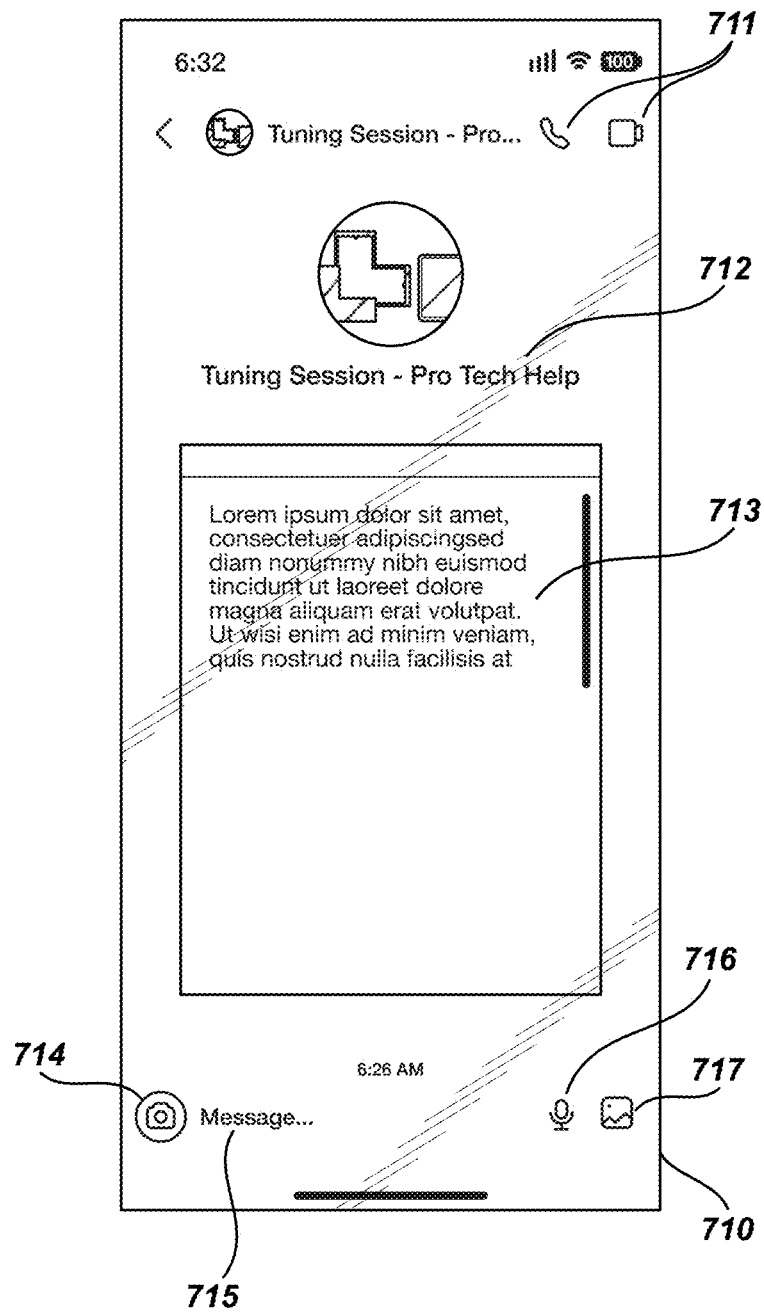
FIG. 12 is a sample display screen of a mobile device according to an embodiment of the invention.

FIG. 11 shows an embodiment of the shot display screen 680, including: a REDO button 681 for redoing a shot; a SAVE button 682 to save data for a shot of the arrow 20; an arrow entrance location 683; an arrow exit location 684 according a shot of the arrow 20 through the apparatus 10 (here including an indication of the fletching of the arrow 20); a speed 685 of the arrow 20; a pair of quantitative skew measures 686 in terms of Right Tear and High Tear; and an icon 687 for accessing gear information.

FIG. 12 shows an embodiment of the shot technician communication screen 710, including: a pair of communication mode icons 711; a communication session title 712; a message text 713; a camera icon 714 for taking a photo to include in the communication session; a message input bar 715; a microphone icon 716 for voice-to-text message input; and a photo upload icon 717.

FIGS. 13 to 16 show a theoretical comparison of skew measurements from a given shot of the arrow 20 through an embodiment of the first light detection unit 100, versus skew information from an identical shot of the arrow 20 through a (theoretical) comparative light detection unit 500. The first light detection unit 100 includes the first array of spaced-apart light sensors 120 disposed on the first arc 117, which has the first radius of curvature 118 equal to the first irradiation distance 148 (see FIG. 13). In contrast, the comparative light detection unit 500 includes a linear array of spaced-apart light sensors disposed along a line 517 that lacks curvature (see FIG. 15). The linear array of spaced-apart light sensors 520 has a midpoint 545, with a midpoint irradiation distance 548 between a line laser source 510 and the midpoint 545. For purposes of the theoretical comparison, the midpoint irradiation distance 548 in the comparative light detection unit 500 is set equal to the first irradiation distance 148 in the light detection unit 100.

For purposes of the theoretical comparison, orientations of the light detection units 100 and 500 are each configured to measure a horizontal skew of the arrow 20. The first laser directional vector 140 in the first light detection unit 100 is oriented vertically downwards, and in the comparative light unit 500 a directional vector midpoint laser is oriented vertically downwards from the light source 510 to the midpoint 545. The theoretical comparison of horizontal skew is based on an analysis of an identical shot of the arrow 20 through each of the first light detection unit 100 and the comparative light detection unit 500.

Figure 14:
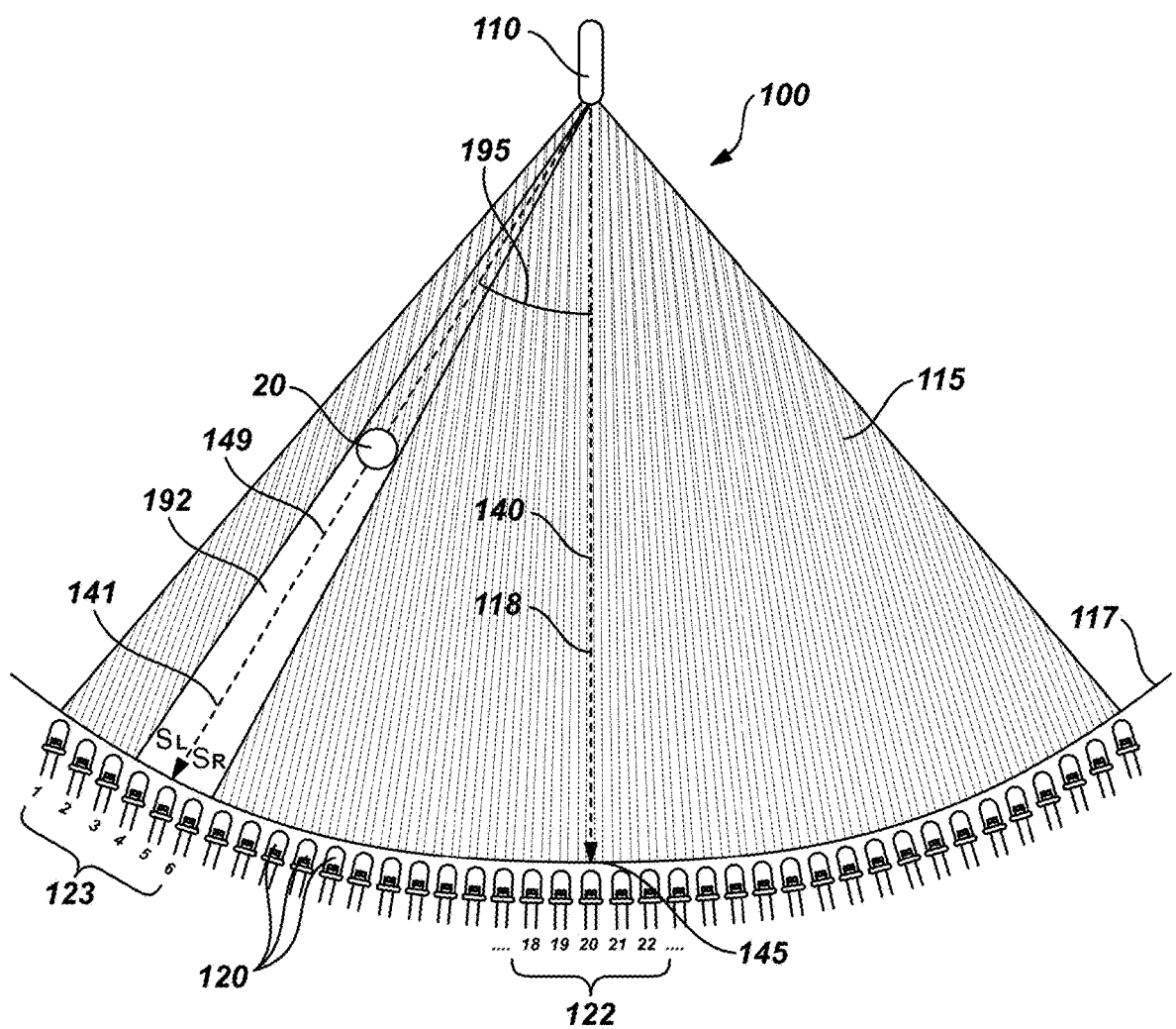
FIG. 14 illustrates a view of an exit point of an arrow from light sensor unit according to an embodiment of the invention.

Referring to FIG. 14, in the first light detection unit 100 the first array of spaced-apart array of light sensors 120 in the first light detection unit 100 is disposed along the first arc 117 having the first radius of curvature 118, which is equal to the first irradiation distance 148 at every point along the first array of spaced-apart light sensors 120, including at an off-midpoint irradiation distance 149.

Figure 16:
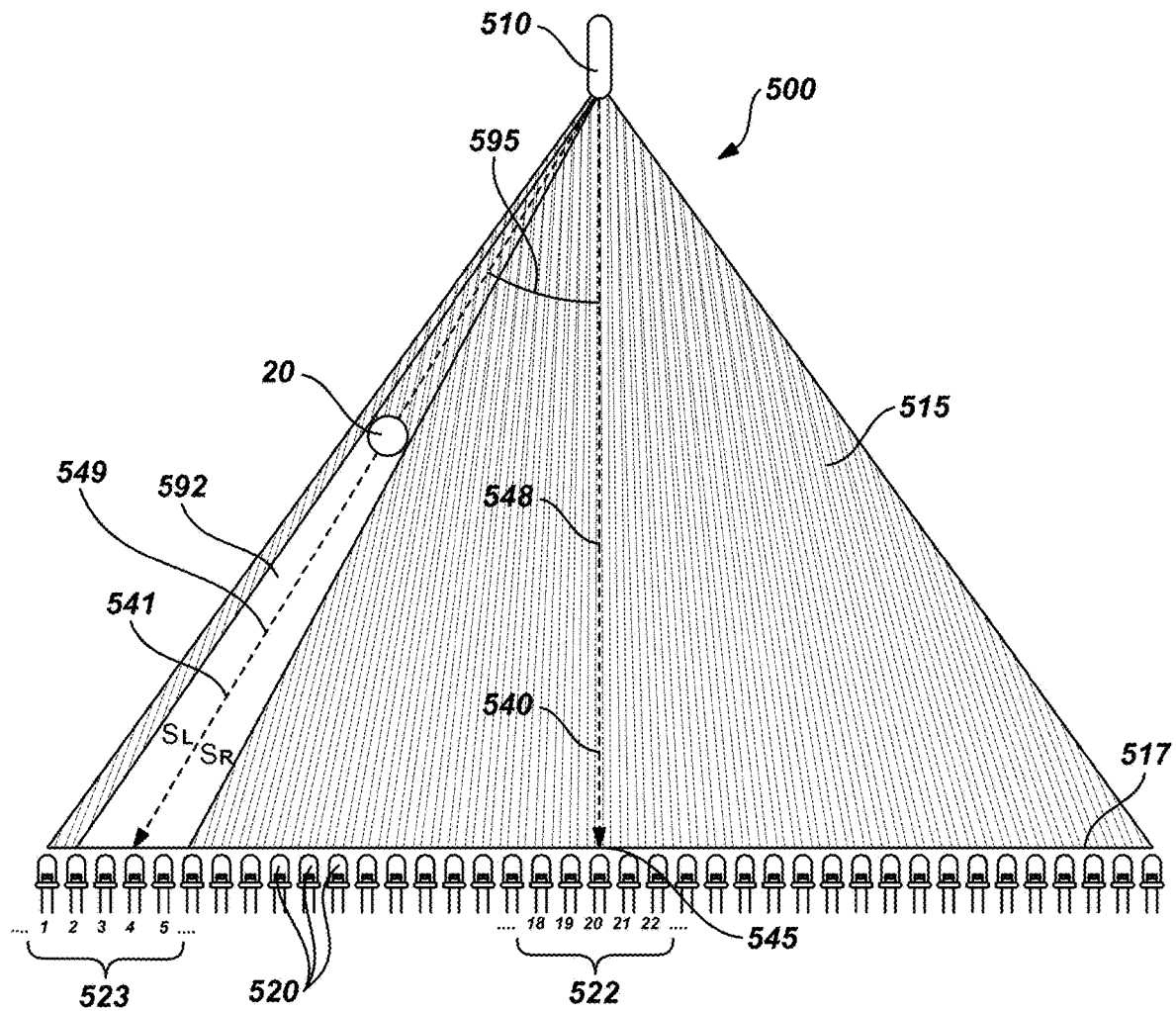
FIG. 16 illustrates a view of an exit point of an arrow from a comparative light sensor unit according to an embodiment of the invention.

FIG. 16 shows that in the comparative light detection unit 500 an off-midpoint irradiation distance 549 between line laser source 510 (along an off-midpoint directional vector 541, forming an angle 595 with respect to a midpoint laser directional vector 540) and the array of spaced-apart light sensors 520 is greater than the midpoint irradiation distance 548 (along midpoint laser directional vector 540). As a result, a sensor cavity 592 cast by the arrow 20 is not symmetrical (i.e., $S_L > S_R$) and is over-projected along the comparative array of spaced-apart light sensors 520.

FIGS. 13 to 16 provide several details regarding the theoretical comparison of the first light detection unit 100 and the comparative light detection unit 500.

Figure 13:
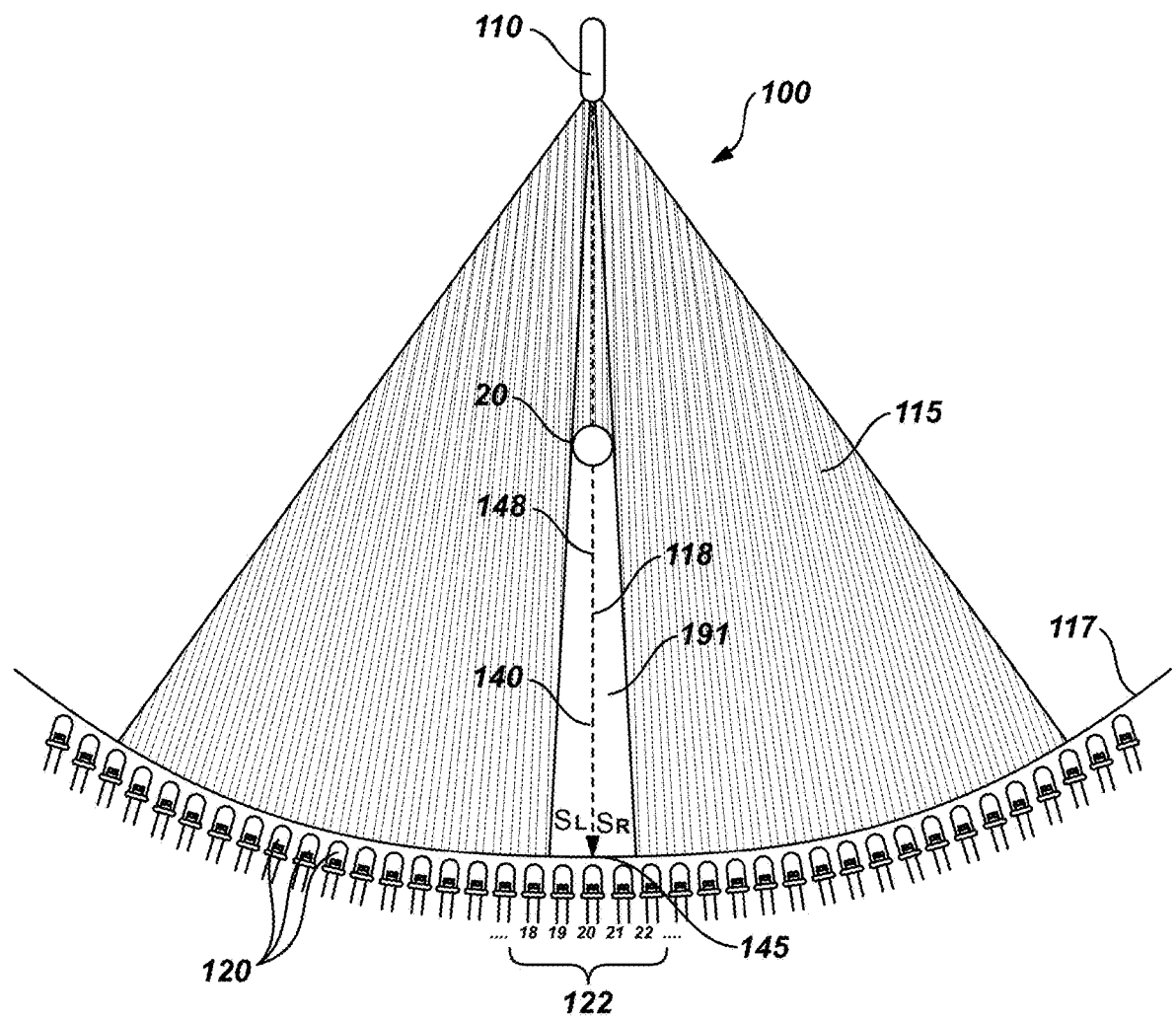
FIG. 13 illustrates a view of an entry point of an arrow into light sensor unit according to an embodiment of the invention.

FIG. 13 shows an entrance of the arrow 20 shot from a bow in cross-section with an initial penetration of the first planar fan of laser light 115 at an intersection with the first directional vector 140 extending from the first line laser source to the first midpoint 145. Each of the light sensors 60 in the first array of spaced-apart light sensors 120 is assigned a light sensor index number increasing from left to right, with a range of from 1 to about 40. The arrow 20 interrupts the first planar fan of laser light 115 to create a sensor cavity (or shadow) 191 over several midpoint light sensors 122 having light sensor index numbers 19 to 21, including a left portion of the sensor cavity $S_L$ and a right portion of the sensor cavity $S_R$. Since the first radius of curvature 118 has the same value as the first irradiation distance 148, the sensor cavity 191 is symmetrical around an average light sensor index for the light sensors 60 in the sensor cavity 191 (i.e., $S_L = S_R$). A coordinate for the entrance of the arrow 20 into the first target region 160 can be calculated from an average of the light sensor index numbers in the sensor cavity 191, as $(19+20+21)/3=20$, which is the light sensor coincident with the first array midpoint 145.

FIG. 14 shows the exit of the arrow 20 from the first planar fan of laser light 115 at the position shown by the cross-section of the arrow 20, along the line for a first off-midpoint laser directional vector 141, forming an angle 195 with respect to the first laser directional vector 140. In this case, the arrow 20 creates a sensor cavity 192 over several peripheral light sensors 123 having light sensor index numbers 4 to 6. The sensor cavity 192 has a left portion $S_L$ and a right portion $S_R$, and since the first radius of curvature 118 has the same value as the first irradiation distance 148 for all points along the first arc 117, the sensor cavity 192 is symmetrical (i.e., $S_L=S_R$). An average of the light sensor index numbers for the exit of the arrow 20 is (4+5+6)/3=5. The amount of horizontal skew for the arrow 20 can be calculated by subtracting: (A) the average of the light sensor index numbers for the entrance of the arrow 20 into the first planar fan of laser light 115 (see FIG. 13) from (B) the average of the light sensor index numbers for the exit of the arrow 20 from the first planar fan of laser light 115 (see FIG. 14), to give a skew value in terms of units of light sensors, or "sensor units", which. in this case is (5−20)=−15 sensor units of skew. Multiplication of the light sensor units of skew by the spacing in the first array of spaced-apart light sensors 120 (for example, about 5 mm) gives a skew value in terms of millimeters, which in the example given is (−15 sensor units×5 mm of horizontal skew/sensor unit)=−75 mm of horizontal skew, that is, a skew 11 value of 75 mm to the left.

Figure 15:
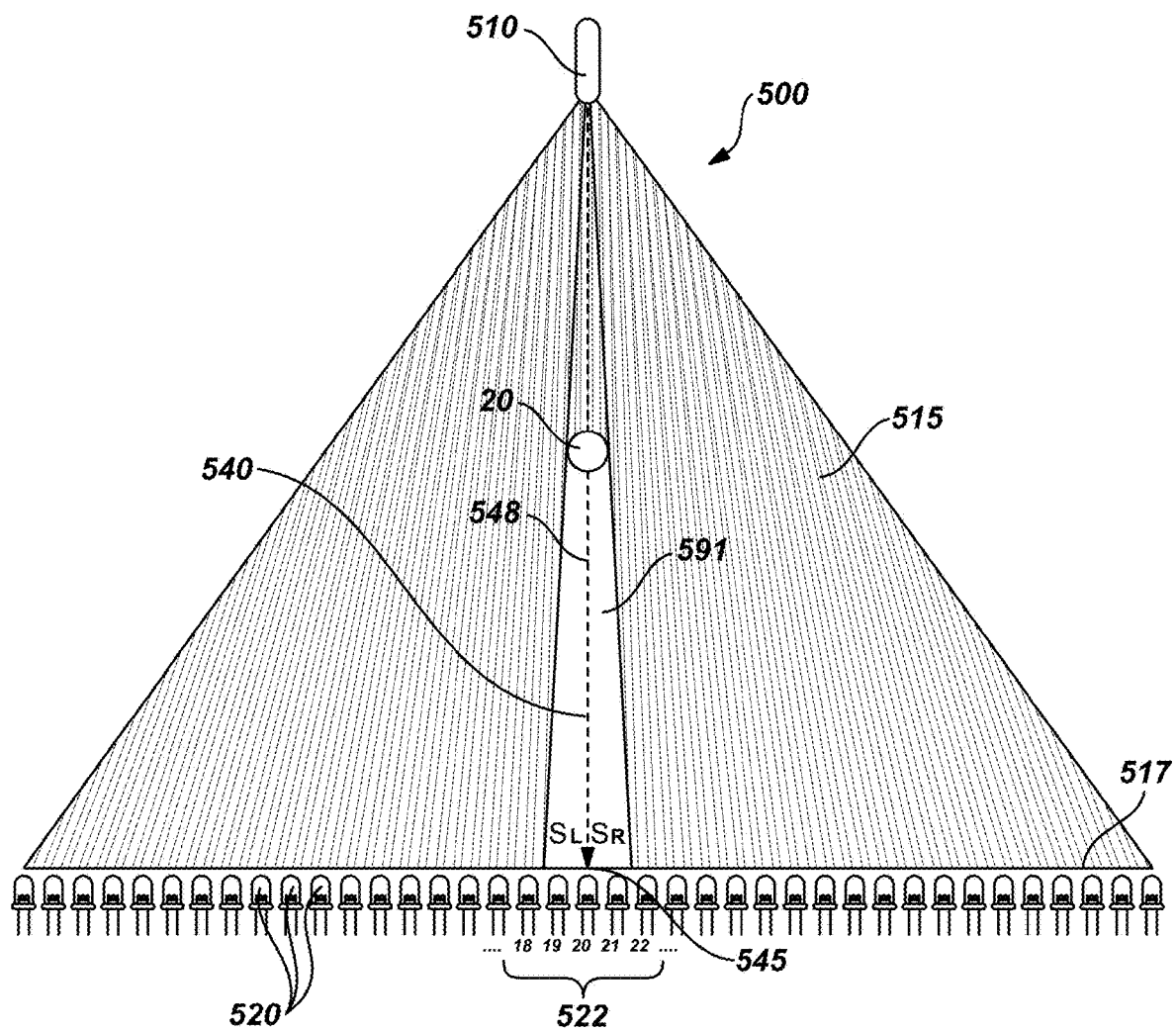
FIG. 15 illustrates a view of an entry point of an arrow into a comparative light sensor unit according to an embodiment of the invention.

FIG. 15 shows the light sensors in the (theoretical) comparative array of spaced-apart light sensors 520 assigned a light sensor index number increasing from left to right, with a range of from 1 to about 40. The arrow 20 shot from a bow is shown in cross-section on an initial penetration of the comparative planar fan of laser light 515 at an intersection with a midpoint laser directional vector 540 extending from the line laser source 510 to the midpoint 545 of the comparative array of spaced-apart light sensors 520. The arrow blocks a portion of the fan of laser light a sensor cavity 591 over midpoint light sensors having light sensor index numbers 19 to 21, with a left portion of the sensor cavity $S_L$ and a right portion of the sensor cavity $S_R$. In this instance the sensor cavity 591 is symmetric around the midpoint 545 (i.e., $S_L=S_R$) and an entrance coordinate of the average of the index numbers (19+20+1)=20.

FIG. 16 shows the exit of the arrow 20 from the comparative planar fan of laser light 515 at the position shown by the cross-section of the arrow 20, creating a sensor cavity 592 over peripheral light sensors 523 having light sensor index numbers 2 to 5. An exit coordinate for the midpoint of the exit of the arrow 20 from the target region can be calculated from an average of the light sensor index numbers (2+3+4+5)/4=3.5.

A skew value based on comparative light detection unit 500 can be calculated by subtracting the entrance coordinate from the exit coordinate: (3.5−20)=−16.5 units of skew. Multiplication of the units of skew by the spacing in the array of spaced-apart light sensors 520 (about 5 mm) gives (−16.5 units of skew×5 mm/unit of skew)=−82.5 mm of horizontal skew, that is, a skew value of 82.5 mm to the left.

The difference between the −70 mm of horizontal skew using the light detection unit 100 and the −82.5 mm of horizontal skew for the comparative light detection unit 500 is significant in the process of determining skew values for the arrow 20, and demonstrates an advantage of using a curved geometry in the first array of spaced-apart light sensors 120, and in particular when the first radius of curvature 118 and the first irradiation distance 148 are approximately equal.

The theoretical comparison between an embodiment of the first light detection unit 100 and the (theoretical) comparative light detection unit 500 may be extended to determining a vertical skew of the arrow 20, by comparing: (A) an embodiment of the apparatus 10 having the first and second light detection units 100 and 200 oriented parallel to each other and rotated by 90 degrees around the normal axis 30; and (B) a comparative apparatus having two light detection units 500 oriented parallel to each other and rotated by 90 degrees around the normal axis 30. When shots of the arrow 20 are considered as identical for the sake of comparison, differences in both the horizontal and vertical components of skew for the arrow 20 will result, due to different geometric configurations of the arrays of spaced-apart light sensors (i.e., curved versus linear). The differences in both the horizontal and vertical skew values will indicate different corrections needed to correct the horizontal component of skew in the arrow 20.

In some embodiments the apparatus 10 may also be used as a chronograph to measure a speed of the arrow 20. The speed of the arrow 20 shot from a bow may be measured as a time difference between: (A) when the tip of the arrow 20 breaks the first planar fan of laser light 115 for the first time; and (B) when the tip of the arrow 20 breaks the second planar fan of laser light 215 for the first time. The perpendicular distance 50 between the first planar fan of laser light 115 and the second planar fan of laser light 215 may be divided by the time difference using the integrated circuitry 400 and the computer software 420, and the resulting speed data for the arrow 20 may be transmitted to the mobile device 450. The speed data for the arrow 20 may be displayed on screens in the mobile app 352 (see FIG. 11, for example, for a display of the speed in feet per second ("fps")).

Figure 17:
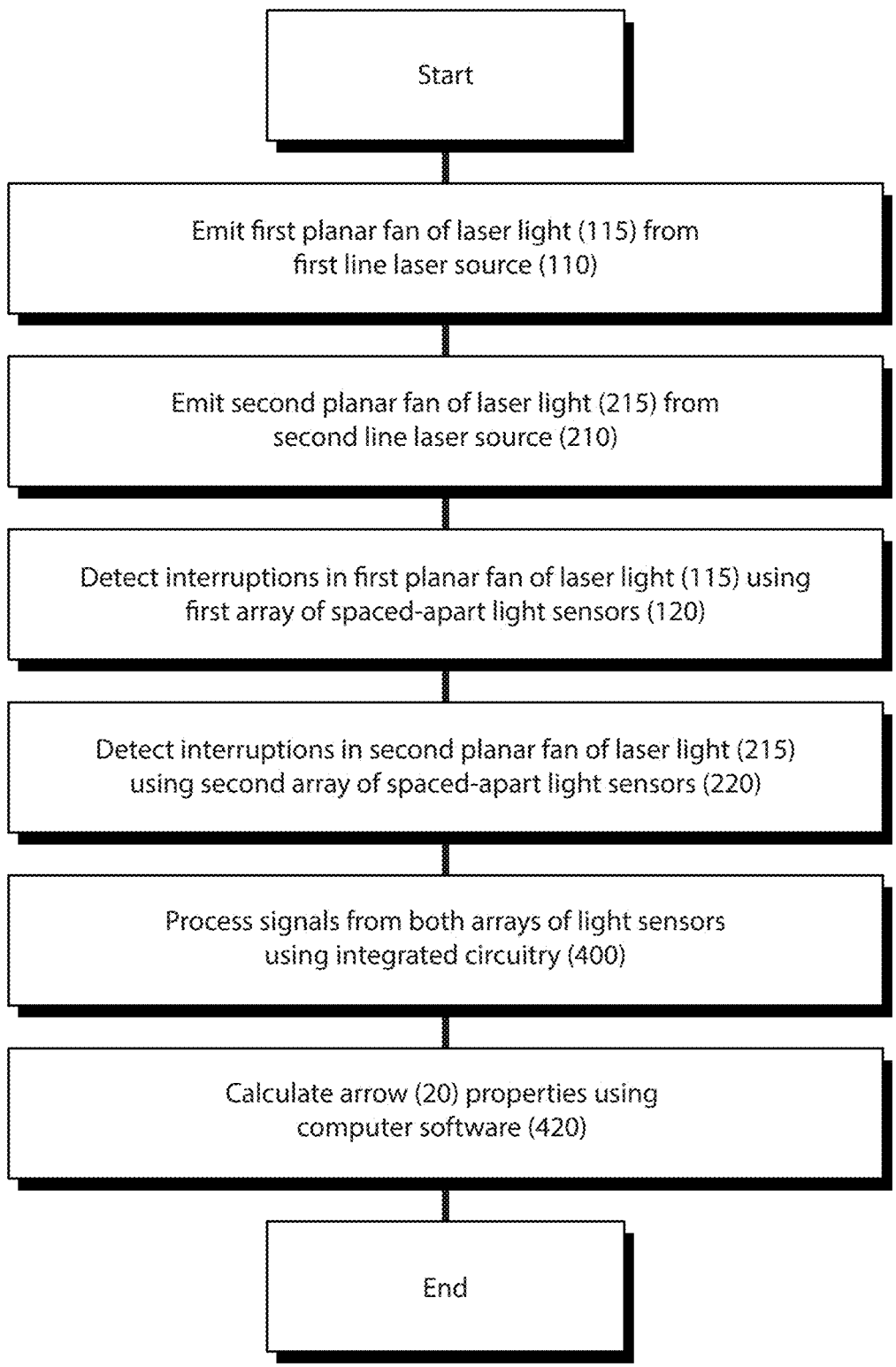
FIG. 17 is a flow chart illustrating a basic method for detecting arrow properties according to an embodiment of the invention.

FIG. 17 shows an embodiment a method of using the apparatus 10, including emitting two fans of laser light 115 and 215 from two separate line laser sources 110 and 210, respectively. The method includes detecting interruptions in the first and second planar fans of laser light 115 and 215 using a first array of spaced-apart light sensors 120 and a second array of spaced-apart light sensors 220, respectively. The method further includes processing signals from both the first array of spaced-apart light sensors 120 and the second array of spaced-apart light sensors 220 using integrated circuitry 400 and calculating arrow 20 properties using computer software 420.

Figure 18:
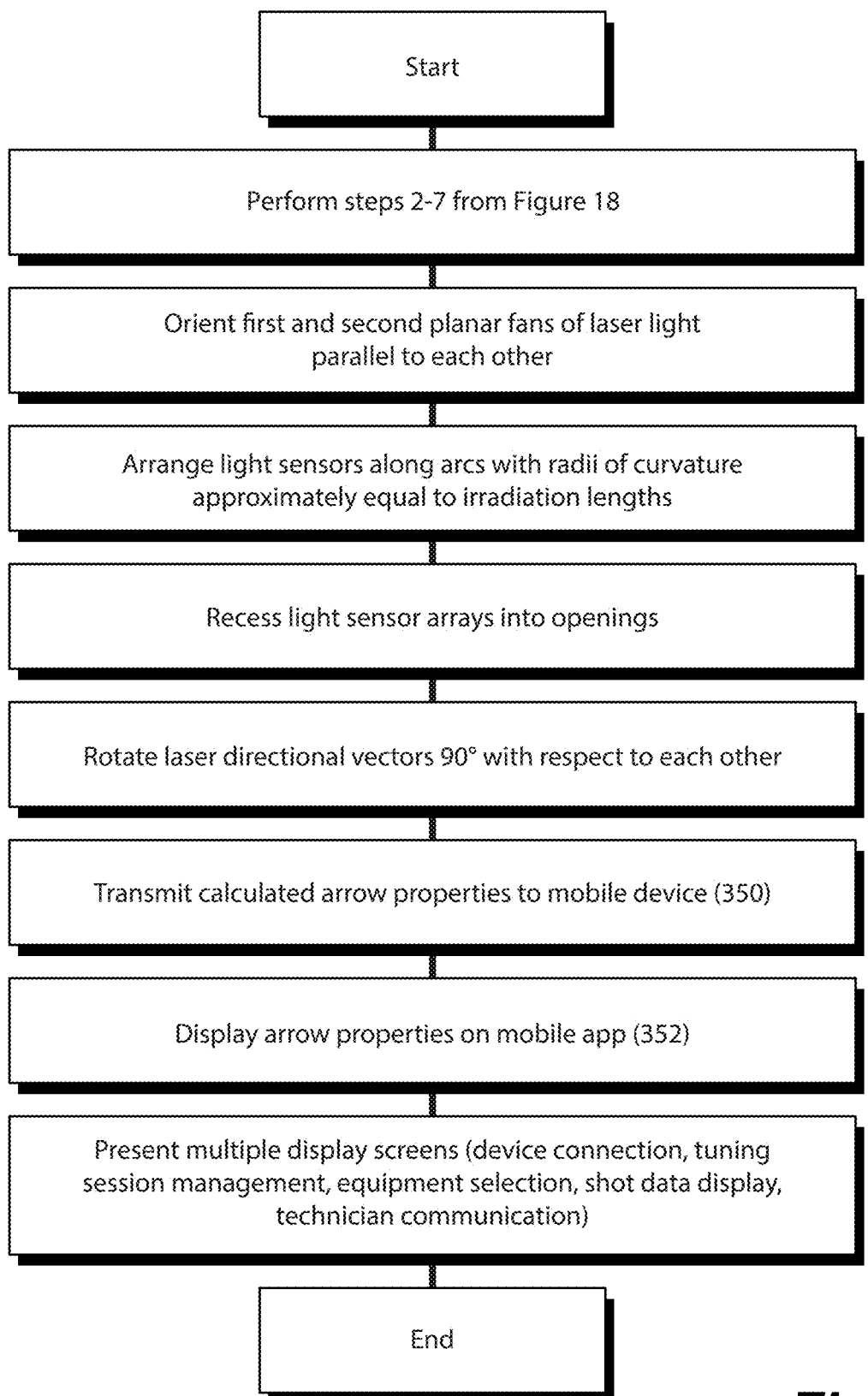
FIG. 18 is a flow chart illustrating an extended method for detecting and displaying arrow properties according to an embodiment of the invention.

FIG. 18 shows a further embodiment of a method of using the apparatus 10, including steps listed in FIG. 17, and further including orienting the first and the second planar fans of laser light 115 and 215 parallel with each other, arranging a first and a second array of spaced-apart light sensors 120 and 220 along a first and a second arc 117 and 217, respectively, with radii of curvature approximately equal to irradiation distances. The method includes recessing the first and the second arrays of spaced-apart light sensors 120 and 220 into a first and a second array of openings 152 and 252 in a first and a second light sensor holder 150 and 250, respectively, and rotating laser directional vectors 140 and 240 by 90° with respect to each other. The method further includes steps of transmitting calculated properties of the arrow 20 to the mobile device 450, displaying arrow properties on a mobile app 352 (not shown), and presenting multiple display screens, including: the device connection screen 650 (FIG. 8); the tuning session management screen 660 (FIG. 9); the equipment selection screen 675 (FIG. 10), the shot data screen 680 (FIG. 11), and the technical communication screen (FIG. 12).

Figure 19:
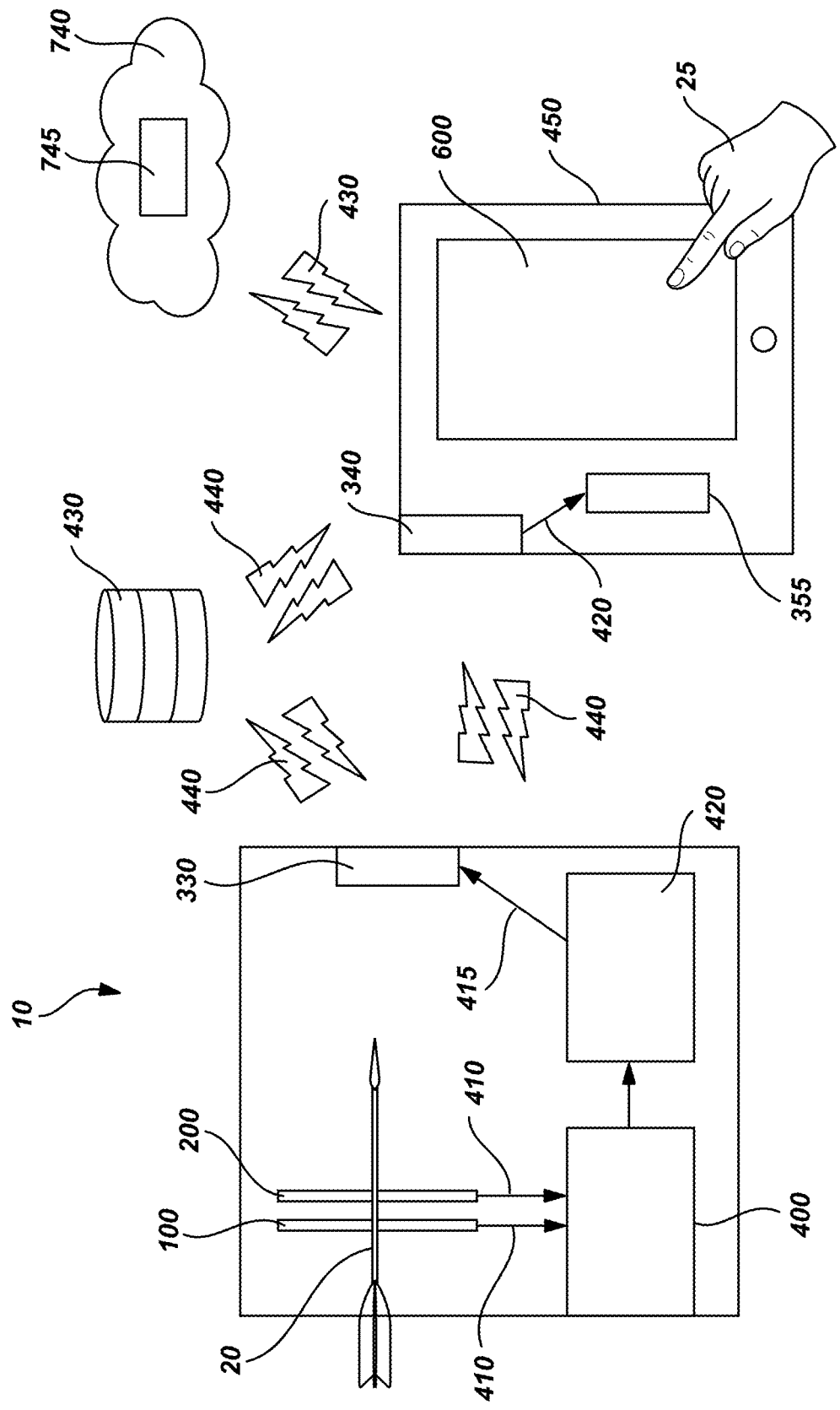
FIG. 19 is a block diagram of the functional components of a system for detecting and displaying arrow properties according to an embodiment of the invention for detecting and displaying arrow properties.

FIG. 19 shows some embodiments of the apparatus 10, including integrated circuitry 400 functionally attached to both the first light detection unit 100 and the second light detection unit 200 via signal-carrying wires 415 connecting the arrays of spaced-apart light sensors 120 and 220 to the integrated circuitry 400 (see FIGS. 7 and 19). The integrated circuitry 400 is configured to be operable to receive target signals 410 from the first array of spaced-apart light sensors 120 and the second array of spaced-apart light sensors 220, respectively, and send the target signals 410 to computer software 420 running on suitable hardware.

The computer software 420 is configured to convert the target signals 410 into information about properties of the arrow 20 shot from a bow. Accordingly, the apparatus measures speed and skew of the arrow 20 as it passes through the first target region 160 and the second target region 260 based on the target signals 410 received by the integrated circuitry 400 and processed by the computer software 420.

In some embodiments of the apparatus 10, apparatus 10 may further include: a transmitter (FIG. 19) configured to receive the information about properties of the arrow 20 via wire 415 or other suitable means, and transmit the information about properties of the arrow 20 to a receiver 340 in the mobile device 450 (FIG. 19) configured to receive the transmitted information; the mobile device 450 including the receiver 340 and a mobile app 352 configured to display the information about properties of the arrow 20. The mobile app 352 may further include multiple display screens configured to receive touch input from a user 25 (see FIG. 19), including a device connection screen 650 (FIG. 8), a tuning session management screen 660 (FIG. 9), an equipment selection screen 675 (FIG. 10), a shot data display screen 680 (FIG. 11), and a technician communication screen 710 (FIG. 12). The mobile app 352 may include other display screens related to information for a tuning session (for example, a display for accessing a history of tuning sessions related to the arrow 20).

As shown in FIG. 19, an embodiment of a method for using the apparatus 10 includes communicating information about the arrow 20 wirelessly (including Wi-Fi or Bluetooth® technology) with the mobile device 450 and a database 430 for storage and retrieval of information related to tuning sessions.

As also shown in FIG. 19, the mobile device communicates with a remote system via cloud-based communication. The cloud symbol 740 represents one or more remote servers or services, and the box 745 within the cloud may represent a conferencing server, media relay, or communication platform that facilitates two-way voice and/or video communication with a remote user, for example, someone with expertise in arrow tuning.

In an embodiment of a method for using the apparatus 10 for measuring the properties of the arrow 20, steps include:
(A) emitting a first planar fan of laser light 115 with a divergence angle 113 of at least 1° from a first line laser source 110;
(B) emitting a second planar fan of laser light 215 with a second divergence angle 213 of at least 2° from a second line laser source 210;
(C) orienting the first planar fan of laser light 115 parallel to the second planar fan of laser light 215;
(D) arranging a first array of spaced-apart light sensors 120 along a first arc 117 disposed entirely within the first divergence angle 113;
(E) arranging a first array of spaced-apart light sensors 220 along a first arc 217 disposed entirely within the first divergence angle 213
(F) detecting interruptions in the first planar fan of laser light 115 using the first array of spaced-apart light sensors 120;
(G) detecting interruptions in the second planar fan of laser light 215 using the second array of spaced-apart light sensors 220;
(H) processing signals from both arrays of spaced-apart light sensors 120 and 220 using integrated circuitry 400;
(I) calculating arrow 20 properties using computer software 420;
(J) transmitting the calculated arrow properties to a mobile device 450;
(K) displaying the arrow properties on a mobile app 352;
(L) presenting multiple display screens on the mobile device 450, including:
  i) a device connection screen 650;
  ii) a tuning session management screen 660;
  iii) an equipment selection screen 675;
  iv) a shot data display screen 680; and
  v) a technician communication screen 710;
(M) recessing the first array of spaced-apart light sensors 120 into a first array of openings 152 and the second array of spaced-apart light sensors 220 into a second array of openings 252;
(N) rotating a first laser directional vector 140 approximately 90° with respect to a second laser directional vector 240;
(O) defining a first target region 160 using the first line laser source 110 and the first array of spaced-apart light sensors 120;
(P) defining a second target region 260 using the second line laser source 210 and the second array of spaced-apart light sensors 220;
(Q) aligning the first target region 160 and the second target region 260 to overlap by at least 10% when viewed along the normal axis 30; and
(R) arranging the first array of spaced-apart light sensors 120 and the second array of spaced-apart light sensors 220 such that a first radius of curvature 118 of the first arc 117 is within +/−50 percent of a first irradiation distance 148, and a second radius of curvature 218 of the second arc 217 is within +/−50 percent of a second irradiation distance 248. While a particular form of the invention has been illustrated and described, it will be apparent that various modifications can be made without departing from the spirit and scope of the invention. Accordingly, it is not intended that the invention be limited, except as by the appended claims.

Particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific embodiments disclosed in the specification, unless the above Detailed Description section explicitly defines such terms. Accordingly, the actual scope of the invention encompasses not only the disclosed embodiments, but also all equivalent ways of practicing or implementing the invention.

The above detailed description of the embodiments of the invention is not intended to be exhaustive or to limit the invention to the precise form disclosed above or to the particular field of usage mentioned in this disclosure. While specific embodiments of, and examples for, the invention are described above for illustrative purposes, various equivalent modifications are possible within the scope of the invention, as those skilled in the relevant art will recognize. Also, the teachings of the invention provided herein can be applied to other systems, not necessarily the system described above. The elements and acts of the various embodiments described above can be combined to provide further embodiments.

All of the above patents and applications and other references, including any that may be listed in accompanying filing papers, are incorporated herein by reference. Aspects of the invention can be modified, if necessary, to employ the systems, functions, and concepts of the various references described above to provide yet further embodiments of the invention.

Changes can be made to the invention in light of the above "Detailed Description." While the above description details certain embodiments of the invention and describes the best mode contemplated, no matter how detailed the above appears in text, the invention can be practiced in many ways. Therefore, implementation details may vary considerably while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated.

While certain aspects of the invention are presented below in certain claim forms, the inventor contemplates the various aspects of the invention in any number of claim forms. Accordingly, the inventor reserves the right to add additional claims after filing the application to pursue such additional claim forms for other aspects of the invention.

What is claimed is:

1. An apparatus for detecting and measuring properties of an arrow shot from a bow, the apparatus comprising:
   a first light detection unit and a second light detection unit;
   wherein the first light detection unit comprises a first line laser source configured to emit a first planar fan of laser light with a first divergence angle and the second light detection unit comprises a second line laser source configured to emit a second planar fan of laser light with a second divergence angle;
   wherein the first planar fan of laser light is oriented parallel to the second planar fan of laser light, and wherein a normal axis passes through and is orthogonal to the first planar fan of laser light and the second planar fan of laser light;
   wherein the first planar fan of laser light and the second planar fan of laser light are spaced apart by a perpendicular distance;
   wherein the first light detection unit comprises a first array of spaced-apart light sensors configured to lie in the first planar fan of laser light along a first arc disposed entirely within the first divergence angle and wherein the first array of spaced-apart light sensors is configured to sense the first planar fan of laser light on a first concave side of the first arc;
   wherein the second light detection unit comprises a second array of spaced-apart light sensors configured to lie in the second planar fan of laser light along a second arc disposed entirely within the second divergence angle and wherein the second array of spaced-apart light sensors is configured to sense the second planar fan of laser light on a second concave side of the second arc;
   wherein the first array of spaced-apart light sensors and the second array of spaced-apart light sensors both comprise at least one light sensor;
   wherein the first arc has a first radius of curvature, and wherein the second arc has a second radius of curvature;
   wherein the first light detection unit comprises a first laser directional vector extending from the first line laser source to a first array midpoint of the first array of spaced-apart light sensors and having a first irradiation distance, and wherein the second light detection unit comprises a second laser directional vector extending from the second line laser source to a second array midpoint of the second array of spaced-apart light sensors and having a second irradiation distance;
   wherein the first radius of curvature is within +/−50 percent of the first irradiation distance, and wherein the second radius of curvature is within +/−50 percent of the second irradiation distance;
   wherein the first light detection unit further comprises a first light sensor holder defining a first array of openings configured with a first curved surface to hold the first array of spaced apart light sensors along first arc, and wherein the second light detection unit further comprises a second light sensor holder defining a second array of openings configured with a second curved surface to hold the second array of spaced apart light sensors along second arc;
   wherein the first planar fan of laser light comprises a first target region within an area defined by the first line laser source and the first array of spaced-apart light sensors, and wherein the second planar fan of laser light comprises a second target region within an area defined by the second line laser source and the second array of spaced-apart light sensors, and wherein the first target region and the second target region are aligned for the normal axis to pass through;
   a frame structure configured to support both the first light detection unit and the second light detection unit, and wherein the frame structure is further configured to permit the arrow shot from a bow to pass entirely through both the first target region and the second target region;
   integrated circuitry functionally attached to both the first light detection unit and the second light detection unit and operable to receive target signals from both the first array of spaced-apart light sensors and the second array of spaced-apart light sensors, and computer software operable to convert the target signals into information about properties of the arrow shot from a bow;
   whereby the apparatus measures speed and skew of the arrow as it passes through the first target region and the second target region based on the target signals received by the integrated circuitry and processed by the computer software.

2. The apparatus of claim 1, wherein the first array of spaced-apart light sensors is recessed into the first array of openings, and wherein the second array of spaced-apart light sensors is recessed into the second array of openings, whereby ambient light interference is reduced for more accurate arrow detection.

3. The apparatus of claim 1, wherein the first target region and the second target region overlap by at least 10 percent when viewed along the direction of the normal axis, whereby the apparatus ensures continuous detection of the arrow as it passes through both target regions.

4. The apparatus of claim 3, wherein the first directional vector and the second directional vector both intersect the normal axis and are rotated with respect to each other by about degrees, whereby the apparatus can detect both vertical and horizontal components of arrow skew.

5. The apparatus of claim 1, wherein the first divergence angle is between about 10 degrees and about 180 degrees, and wherein the second divergence angle is between about 10 degrees and about 180 degrees, whereby the apparatus provides a wide detection area while maintaining measurement accuracy.

6. The apparatus of claim 1, wherein the first radius of curvature and the first irradiation distance are approximately equal, and wherein the second radius of curvature and the second irradiation distance are approximately equal, whereby the apparatus optimizes the detection sensitivity across an entire target region.

7. The apparatus of claim 1, further comprising:
a transmitter to transmit the information about properties of the arrow from the integrated circuitry to a receiver on a mobile device via wireless communication, and
a mobile app on the mobile device configured to display the speed and the skew information calculated by the computer software to a user,
whereby the apparatus provides real-time feedback on arrow performance to the user.

8. The apparatus of claim 7, wherein the mobile app is configured to show multiple display screens including:
a device connection screen for connecting to nearby devices,
a tuning session management screen for organizing and accessing saved tuning sessions,
an equipment selection screen for inputting and selecting archery equipment details,
a shot data display screen showing arrow speed and skew information, and
a technician communication screen for connecting with an archery technician,
whereby the mobile app provides comprehensive functionality for managing arrow tuning sessions and analyzing performance data.

9. An apparatus for detecting and measuring properties of an arrow shot from a bow, the apparatus comprising:
a first light detection unit and a second light detection unit;
wherein the first light detection unit comprises a first line laser source configured to emit a first planar fan of laser light with a first divergence angle of at least 10°, and the second light detection unit comprises a second line laser source configured to emit a second planar fan of laser light with a second divergence angle of at least 10°;
wherein the first planar fan of laser light is oriented parallel to the second planar fan of laser light, and wherein a normal axis passes through and is orthogonal to the first planar fan of laser light and the second planar fan of laser light;
wherein the first planar fan of laser light and the second planar fan of laser light are spaced apart by a perpendicular distance;
wherein the first light detection unit comprises a first array of spaced-apart light sensors configured to lie in the first planar fan of laser light along a first arc disposed entirely within the first divergence angle and wherein the first array of spaced-apart light sensors is configured to sense the first planar fan of laser light on a first concave side of the first arc;
wherein the second light detection unit comprises a second array of spaced-apart light sensors configured to lie in the second planar fan of laser light along a second arc disposed entirely within the second divergence angle and wherein the second array of spaced-apart light sensors is configured to sense the second planar fan of laser light on a second concave side of the second arc;
wherein the first array of spaced-apart light sensors and the second array of spaced-apart light sensors are recessed into a first array of openings and a second array of openings respectively;
wherein the first arc has a first radius of curvature, and wherein the second arc has a second radius of curvature;
wherein the first light detection unit comprises a first laser directional vector extending from the first line laser source to a first array midpoint of the first array of spaced-apart light sensors and having a first irradiation distance, and wherein the second light detection unit comprises a second laser directional vector extending from the second line laser source to a second array midpoint of the second array of spaced-apart light sensors and having a second irradiation distance;
wherein the first radius of curvature is approximately equal to the first irradiation distance, and wherein the second radius of curvature is approximately equal to the second irradiation distance;
wherein the first laser directional vector and the second laser directional vector are rotated approximately 90° with respect to each other about the normal axis;
a frame structure configured to support both the first light detection unit and the second light detection unit;
integrated circuitry functionally attached to both the first light detection unit and the second light detection unit and operable to receive target signals from both the first array of spaced-apart light sensors and the second array of spaced-apart light sensors;
computer software operable to convert the target signals into information about properties of the arrow;
a transmitter configured to transmit the information about properties of the arrow;
a receiver configured to receive the transmitted information;
a mobile device comprising the receiver and a mobile app configured to display the information about properties of the arrow, wherein the mobile app comprises multiple display screens including a device connection screen, a tuning session management screen, an equipment selection screen, a shot data display screen, and a technician communication screen.

10. A method for detecting and measuring properties of an arrow shot from a bow, the method comprising:
emitting a first planar fan of laser light from a first line laser source;
emitting a second planar fan of laser light from a second line laser source, wherein the first planar fan of laser light is parallel to the second planar fan of laser light;
detecting interruptions in the first planar fan of laser light using a first array of spaced-apart light sensors;
detecting interruptions in the second planar fan of laser light using a second array of spaced-apart light sensors;
processing signals from the first array of spaced-apart light sensors and the second array of spaced-apart light sensors using integrated circuitry; and
calculating speed and skew of the arrow as it passes through the first planar fan of laser light and the second planar fan of laser light, using computer software based on the processed signals.

11. The method of claim 10, further comprising:
orienting the first planar fan of laser light parallel to the second planar fan of laser light, wherein a normal axis passes through and is orthogonal to both planar fans of laser light.

12. The method of claim 10, wherein the first array of spaced-apart light sensors is arranged along a first arc and the second array of spaced-apart light sensors is arranged along a second arc.

13. The method of claim 12, wherein the first arc has a first radius of curvature approximately equal to a first irradiation distance from the first line laser source to a first array midpoint, and the second arc has a second radius of curvature approximately equal to a second irradiation distance from the second line laser source to a second array midpoint.

14. The method of claim 10, further comprising:
transmitting the calculated information about properties of the arrow to a mobile device.

15. The method of claim 14, further comprising:
displaying the calculated information about properties of the arrow on a mobile app on the mobile device.

16. The method of claim 15, wherein the mobile app comprises multiple display screens including at least one of: a device connection screen, a tuning session management screen, an equipment selection screen, a shot data display screen, and a technician communication screen.

17. The method of claim 10, wherein the first and the second line laser sources emit planar fans of laser light with divergence angles of at least 10°.

18. The method of claim 10, further comprising:
recessing the first array of spaced-apart light sensors into a first array of openings and the second array of spaced-apart light sensors into a second array of openings.

19. The method of claim 10, further comprising:
rotating a first laser directional vector of the first light detection unit approximately 90° with respect to a second laser directional vector of the second light detection unit about the normal axis.

* * * * *